(12) United States Patent
Flor et al.

(10) Patent No.: US 9,519,634 B2
(45) Date of Patent: Dec. 13, 2016

(54) SYSTEMS AND METHODS FOR DETERMINING LEXICAL ASSOCIATIONS AMONG WORDS IN A CORPUS

(71) Applicant: Educational Testing Service, Princeton, NJ (US)

(72) Inventors: Michael Flor, Lawrenceville, NJ (US); Beata Beigman Klebanov, Hopewell, NJ (US)

(73) Assignee: Educational Testing Service, Princeton, NJ (US)

( * ) Notice: Subject to any disclaimer, the term of this patent is extended or adjusted under 35 U.S.C. 154(b) by 0 days.

(21) Appl. No.: 14/726,928

(22) Filed: Jun. 1, 2015

(65) Prior Publication Data

US 2015/0347385 A1    Dec. 3, 2015

Related U.S. Application Data

(60) Provisional application No. 62/005,576, filed on May 30, 2014.

(51) Int. Cl.
  *G06F 17/27*  (2006.01)
  *G06F 17/30*  (2006.01)
  *G10L 15/06*  (2013.01)

(52) U.S. Cl.
  CPC ......... *G06F 17/277* (2013.01); *G06F 17/2715* (2013.01)

(58) Field of Classification Search
  CPC ........... G10L 15/06; G06F 17/30; G06F 17/27
  (Continued)

(56) References Cited

U.S. PATENT DOCUMENTS

2005/0091030 A1\* 4/2005 Jessee ................. G06F 17/26
                                                                704/4
2011/0295840 A1\* 12/2011 Ciaramita ......... G06F 17/30442
                                                              707/719

(Continued)

OTHER PUBLICATIONS

Bouma, "Normalized (Pointwise) Mutual Information in Collocation Extraction"; in From Form to Meaning: Processing Texts Automatically; Proceedings of the Biennial GSCL Conference; pp. 31-40; 2009.\*

(Continued)

*Primary Examiner* — Pierre-Louis Desir
*Assistant Examiner* — Seong Ah A Shin
(74) *Attorney, Agent, or Firm* — Jones Day

(57) ABSTRACT

Systems and methods are provided for identifying one or more target words of a corpus that have a lexical relationship to a plurality of provided cue words. The cue words and statistical lexical information derived from a corpus of documents are analyzed to determine candidate words that have a lexical association with the cue words. The statistical information includes numerical values indicative of probabilities of word pairs appearing together as adjacent words in a well-formed text or appearing together within a paragraph of a well-formed text. For each candidate word, a statistical association score between the candidate word and each of the cue words is determined. An aggregate score for each of the candidate words is determined based on the statistical association scores. One or more of the candidate words are selected to be the one or more target words based on the aggregate scores.

21 Claims, 15 Drawing Sheets

(58) Field of Classification Search
USPC .................................................. 704/9, 245
See application file for complete search history.

(56) References Cited

U.S. PATENT DOCUMENTS

2014/0234810 A1* 8/2014 Flor ..................... G09B 7/02
434/169
2016/0012818 A1* 1/2016 Faizakof ........... G06F 17/30705
704/245

OTHER PUBLICATIONS

4th Workshop on Cognitive Aspects of the Lexicon (CogALex) together with a shared task concerning the 'lexical access-problem', 2014.*
Evert, "Corpora and collocation" University of Osnabrück, Oct. 2007.*
Flor et al., "Lexical Tightness and Text Complexity", Proceedings of the 2nd Workshop of Natural Language Processing for Improving Textual Accessibility (NLP4ITA); pp. 29-38; Jun. 2013.*
Jacquemin et al., "NLP for term variant extraction: synergy between morphology, lexicon, and syntax." Natural language information retrieval. Springer Netherlands, 1999. 25-74.*
Church et al., "Word association norms, mutual information, and lexicography." Computational linguistics 16.1 (1990): 22-29.*
Baroni, Marco, Lenci, Alessandro; Distributional Memory: A General Framework for Corpus-Based Semantics; Computational Linguistics, 36(4); pp. 673-721; 2010.
Beigman Klebanov, Beata, Flor, Michael; Word Association Profiles and Their Use for Automated Scoring of Essays; Proceedings of the 51st Annual Meeting of the Association for Computational Linguistics; pp. 1148-1158; Aug. 2013.
Beigman Klebanov, Beata, Flor, Michael; Associative Texture is Lost in Translation; Proceedings of the Workshop on Discourse in Machine Translation (DiscoMT); pp. 27-32; Aug. 2013.
Bouma, Gerlof; Normalized (Pointwise) Mutual Information in Collocation Extraction; in From Form to Meaning: Processing Texts Automatically; Proceedings of the Biennial GSCL Conference; pp. 31-40; 2009.
Bullinaria, John, Levy, Joseph; Extracting Semantic Representations from Word Co-Occurrence Statistics: A Computational Study; Behavior Research Methods, 39; pp. 510-526; 2007.
Church, Kenneth, Hanks, Patrick; Word Association Norms, Mutual Information, and Lexicography; Computational Linguistics, 16(1); pp. 22-29; Mar. 1990.
Evert, Stefan; Corpora and Collocations; in Corpus Linguistics: An International Handbook, A. Ludeling & M. Kyto (Eds.); Mouton de Gruyter: Berlin, Germany; 2008.
Flor, Michael; A Fast and Flexible Architecture for Very Large Word N-Gram Datasets; Natural Language Engineering, 19(1); pp. 61-93; Jan. 2013.
Flor, Michael; Four Types of Context for Automatic Spelling Correction; Traitement Automatique des Langues (TAL), 53(3); Special Issue: Managing Noise in the Signal: Error Handling in Natural Langauge Processing; pp. 61-99; 2012.
Flor, Michael, Beigman Klebanov, Beata; Associative Lexical Cohesion as a Factor in Text Complexity; International Journal of Applied Linguistics,165(2); 2014.
Flor, Michael, Beigman Klebanov, Beata, Sheehan, Kathleen; Lexical Tightness and Text Complexity; Proceedings of the 2nd Workshop of Natural Language Processing for Improving Textual Accessibility (NLP4ITA); pp. 29-38; Jun. 2013.
Graff, David, Cieri, Christopher; English Gigaword LDC2003T05; Linguistic Data Consortium; Philadelphia, PA; 2003.
Kiss, G., Armstrong, Christine, Milroy, R., Piper, J.; An Associative Thesaurus of English and its Computer Analysis; in the Computer and Literary Studies, A. Atken, et al. (Eds.); University Press: Edinburgh, UK; pp. 153-165; 1973.
Manning, Christopher, Raghavan, Prabhakar, Schutze, Hinrich; An Introduction to Information Retrieval; Cambridge University Press: Cambridge, UK; 2008.
Mitton, Roger; Ordering the Suggestions of a Spellchecker Without Using Context; Natural Language Engineering, 15(2); pp. 173-192; Apr. 2009.
Rapp, Reinhard; Corpus-Based Computation of Reverse Associations; Proceedings of LREC; pp. 1380-1386; 2014.
Turney, Peter, Pantel, Patrick; From Frequency to Meaning: Vector Space Models of Semantics; Journal of Artificial Intelligence Research, 37; pp. 141-188; 2010.

* cited by examiner

| Cue Word #1 | | |
|---|---|---|
| Rank | Candidate Word | Assoc. Score with Cue Word #1 |
| 1 | mocha | 0.07 |
| 2 | espresso | 2.00 |
| 3 | cappuccino | 2.30 |
| 4 | drink | 5.62 |

| Cue Word #2 | | |
|---|---|---|
| Rank | Candidate Word | Assoc. Score with Cue Word #1 |
| 1 | cappuccino | 0.70 |
| 2 | drink | 1.11 |
| 3 | mocha | 3.30 |
| 4 | espresso | 4.32 |

SYSTEMS AND METHODS FOR DETERMINING LEXICAL ASSOCIATIONS AMONG WORDS IN A CORPUS

CROSS-REFERENCE TO RELATED APPLICATIONS

This application claims priority to U.S. Provisional Patent Application No. 62/005,576, filed May 30, 2014, entitled "Systems and Methods for Determining Lexical Associations Among Words in a Corpus," which is incorporated herein by reference in its entirety.

FIELD

The technology described in this patent document relates generally to computational linguistics and more particularly to systems and methods for determining one or more target words or n-grams of a corpus that have a lexical relationship to a plurality of provided cue words.

BACKGROUND

One of the striking developments in computational linguistics in recent years has been the rapid progress in the automatic analysis of text. This is especially so where the extraction of semantic content is concerned. The adoption of statistical, corpus-based techniques within natural language processing, the continued development of information extraction techniques, and the emergence of more effective algorithms for extracting particular aspects of linguistic and discourse structure have largely driven such progress. Effective applications have become a reality in a variety of fields, such as machine translation and automatic summarization, due to the progress of automated text analysis applications.

SUMMARY

The present disclosure is directed to a computer-implemented method, system, and non-transitory computer-readable storage medium for identifying one or more target words or n-grams of a corpus that have a lexical relationship to a plurality of provided cue words. In an example computer-implemented method of identifying one or more target words of a corpus that have a lexical relationship to a plurality of provided cue words, a plurality of cue words are received. The cue words and statistical lexical information derived from a corpus of documents are analyzed to determine candidate words that have a lexical association with the cue words. The statistical information includes numerical values indicative of probabilities of word pairs appearing together as adjacent words in a well-formed text or appearing together within a paragraph of a well-formed text. For each candidate word, a statistical association score between the candidate word and each of the cue words is determined using numerical values included in the statistical information. For each candidate word, an aggregate score for each of the candidate words is determined based on the statistical association scores. One or more of the candidate words are selected to be the one or more target words based on the aggregate scores of the candidate words.

An example system for identifying one or more target words of a corpus that have a lexical relationship to a plurality of provided cue words includes a processing system and a computer-readable memory in communication with the processing system. The computer-readable memory is encoded with instructions for commanding the processing system to execute steps. In executing the steps, a plurality of cue words are received. The cue words and statistical lexical information derived from a corpus of documents are analyzed to determine candidate words that have a lexical association with the cue words. The statistical information includes numerical values indicative of probabilities of word pairs appearing together as adjacent words in a well-formed text or appearing together within a paragraph of a well-formed text. For each candidate word, a statistical association score between the candidate word and each of the cue words is determined using numerical values included in the statistical information. For each candidate word, an aggregate score for each of the candidate words is determined based on the statistical association scores. One or more of the candidate words are selected to be the one or more target words based on the aggregate scores of the candidate words.

In an example non-transitory computer-readable storage medium for identifying one or more target words of a corpus that have a lexical relationship to a plurality of provided cue words, the computer-readable storage medium includes computer executable instructions which, when executed, cause a processing system to execute steps. In executing the steps, a plurality of cue words are received. The cue words and statistical lexical information derived from a corpus of documents are analyzed to determine candidate words that have a lexical association with the cue words. The statistical information includes numerical values indicative of probabilities of word pairs appearing together as adjacent words in a well-formed text or appearing together within a paragraph of a well-formed text. For each candidate word, a statistical association score between the candidate word and each of the cue words is determined using numerical values included in the statistical information. For each candidate word, an aggregate score for each of the candidate words is determined based on the statistical association scores. One or more of the candidate words are selected to be the one or more target words based on the aggregate scores of the candidate words.

In an example computer-implemented method of identifying one or more target n-grams of a corpus that have a lexical relationship to a plurality of provided cue words, a plurality of cue words are received. The cue words and statistical lexical information derived from a corpus of documents are analyzed to determine candidate n-grams that have a lexical association with the cue words. The statistical information includes numerical values indicative of probabilities of multiple words appearing together as adjacent words in text of the corpus or appearing together within a paragraph of text in the corpus. For each candidate n-gram, a statistical association score between the candidate n-gram and each of the cue words is determined using numerical values of the dataset. For each candidate n-gram, an aggregate score for each of the candidate n-grams is generated based on the statistical association scores. One or more of the candidate n-grams are selected to be the one or more target n-grams based on the aggregate scores of the candidate n-grams.

An example system for identifying one or more target n-grams of a corpus that have a lexical relationship to a plurality of provided cue words includes a processing system and a computer-readable memory in communication with the processing system. The computer-readable memory is encoded with instructions for commanding the processing system to execute steps. In executing the steps, a plurality of cue words are received. The cue words and statistical lexical information derived from a corpus of documents are analyzed to determine candidate n-grams that have a lexical association with the cue words. The statistical information includes numerical values indicative of probabilities of multiple words appearing together as adjacent words in text of the corpus or appearing together within a paragraph of text in the corpus. For each candidate n-gram, a statistical association score between the candidate n-gram and each of the cue words is determined using numerical values of the dataset. For each candidate n-gram, an aggregate score for each of the candidate n-grams is generated based on the statistical association scores. One or more of the candidate n-grams are selected to be the one or more target n-grams based on the aggregate scores of the candidate n-grams.

In an example non-transitory computer-readable storage medium for identifying one or more target n-grams of a corpus that have a lexical relationship to a plurality of provided cue words, the computer-readable storage medium includes computer executable instructions which, when executed, cause a processing system to execute steps. In executing the steps, a plurality of cue words are received. The cue words and statistical lexical information derived from a corpus of documents are analyzed to determine candidate n-grams that have a lexical association with the cue words. The statistical information includes numerical values indicative of probabilities of multiple words appearing together as adjacent words in text of the corpus or appearing together within a paragraph of text in the corpus. For each candidate n-gram, a statistical association score between the candidate n-gram and each of the cue words is determined using numerical values of the dataset. For each candidate n-gram, an aggregate score for each of the candidate n-grams is generated based on the statistical association scores. One or more of the candidate n-grams are selected to be the one or more target n-grams based on the aggregate scores of the candidate n-grams.

DETAILED DESCRIPTION

Figure 1A:
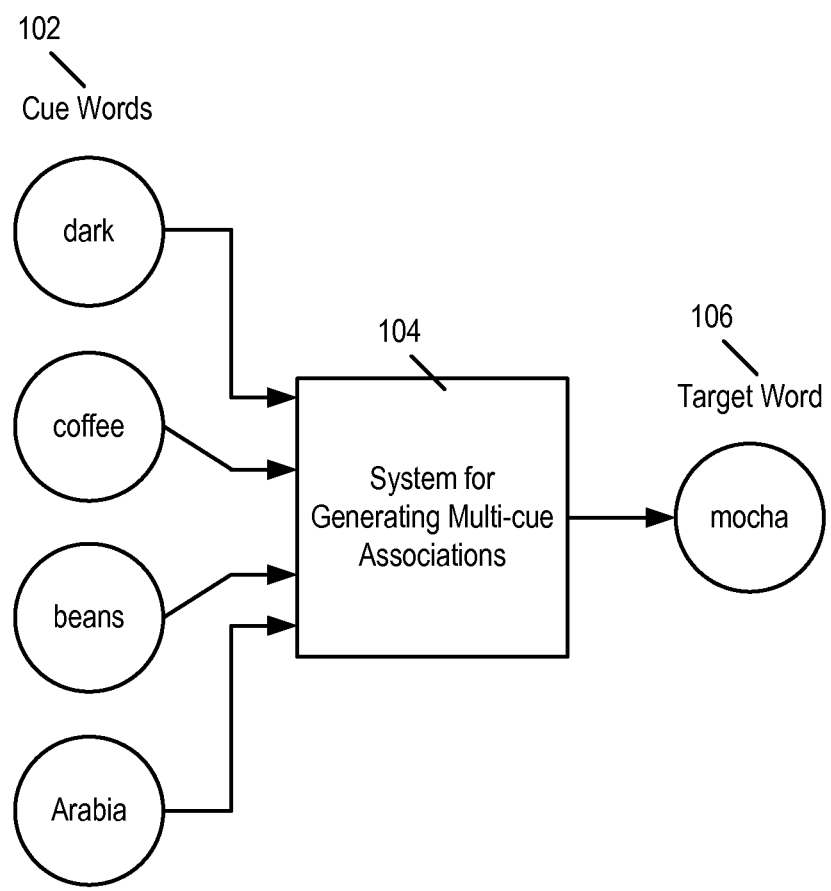
FIG. 1A is a block diagram depicting an exemplary use of a system configured to determine one or more target words that are strongly related to a plurality of cue words.

FIG. 1A is a block diagram depicting an exemplary use of a system 104 configured to determine one or more target words 106 that are strongly related to a plurality of cue words 102. The exemplary use of the system 104 of FIG. 1A may be for a "tip-of-the-tongue" application. For example, a person may be looking for a word expressing the following ideas: "superior dark coffee made of beans from Arabia." The person may not be able to remember the intended word "mocha," but the person may be able to produce related words (e.g., "dark," "coffee," "beans," "Arabia," etc.). The system 104 of FIG. 1A may be configured to accept such related words, denoted as "cue words" 102 in the figure. The system 104 may be configured to process the cue words 102 to generate one or more target words 106 that have a lexical relationship to the plurality of cue words 102. In the example of FIG. 1A, the system 104 may generate a single target word 106 ("mocha"), but in other examples, the system 104 may determine multiple target words 106 (e.g., a ranked or unranked list of words including "mocha," "espresso," "cappuccino"). A user of the system 104 would then be able to review the one or more target words 106 to evaluate whether the words 106 include the intended, tip-of-the-tongue word.

Figure 1B:
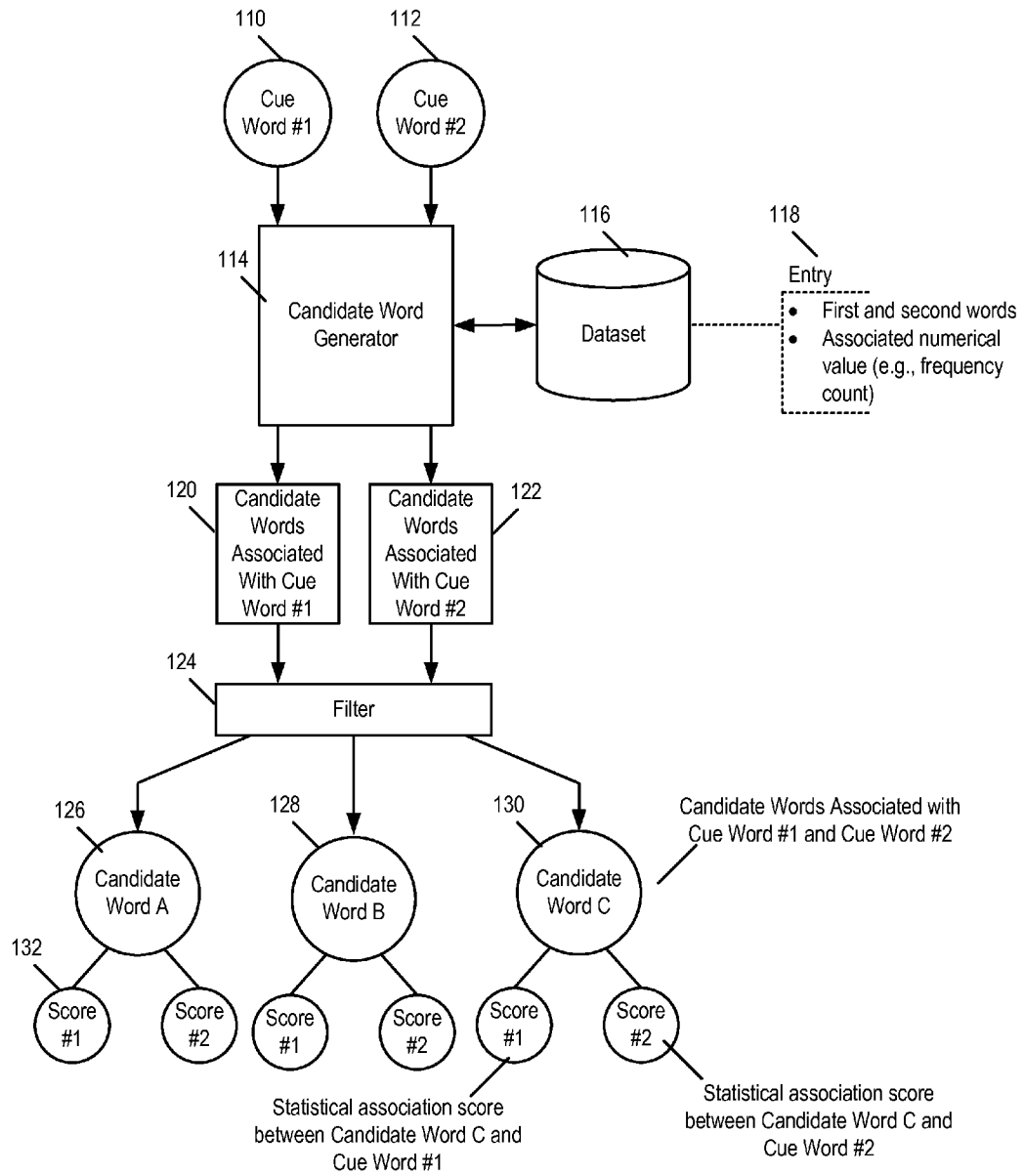
FIG. 1B depicts features of the system of FIG. 1A.

FIG. 1B depicts features of the system 104 of FIG. 1A. As shown in the figure, the system 104 may include a candidate word generator 114 configured to receive a plurality of cue words 110, 112. The cue words 110, 112 may be, for example, the words "dark" and "coffee," discussed above with reference to FIG. 1A. Although the example of FIG. 1B depicts the candidate word generator 114 receiving two cue words 110, 112, in other examples, the candidate word generator 114 receives a higher number of cue words (e.g., five cue words, etc.). The candidate word generator 114 may process the Cue Word #1 110 to generate candidate words 120 associated the Cue Word #1 110, and similarly, the candidate word generator 114 may process the Cue Word #2 112 to generate candidate words 122 associated the Cue Word #2 112. The candidate words 120, 122 are words that could potentially be selected as the one or more target words 106 by the system 104.

To generate the candidate words 120, 122, the cue words 110, 112 and a dataset 116 may be analyzed with a processing system (e.g., a computer processor). The dataset 116 may include statistical lexical information derived from a corpus of documents. Specifically, the dataset 116 may include a plurality of entries, where an entry may include (i) first and second English words, and (ii) a numerical value associated with the first and second English words. The numerical value may provide statistical information about the first and second English words. In an example, the numerical value may be indicative of a probability of the first and second English words appearing together as an adjacent word pair in a well-formed text or a probability of the first and second English words appearing together within a paragraph of a well-formed text. An example entry 118 of the dataset 116 is shown in FIG. 1B to include first and second English words and a frequency count, where the frequency count indicates a number of times that the first and second English words of the entry 118 appear together as an adjacent word pair in a text corpus or a number of times that the first and second English words of the entry 118 appear together within respective paragraphs of the text corpus. The generation of the dataset 116 is described below with reference to FIG. 2.

As noted above, the generation of the candidate words 120, 122 may include analyzing the cue words 110, 112 and the dataset 116. In an example, a cue word is searched across entries of the dataset 116 to determine candidate words that are associated with the cue word. As described below with reference to FIG. 2, the dataset 116 may include thousands, millions, or billions of entries. The searching of the cue word across the entries of the dataset 116 may return entries of the dataset 116 including the cue word, i.e., a returned entry includes the cue word as the first or second English word of the entry. The other English word in a returned entry may comprise a candidate word that is associated with the cue word. In an example, the Cue Word #1 110 is the word "letter." Searching the word "letter" across the entries of the dataset 116 may return an entry of the dataset 116 including the English words "write" and "letter." The word "write" may be determined to be a candidate word of the candidate words 120 that are associated with the Cue Word #1 110.

As described below with reference to FIG. 9, a number of candidate words may be increased by processing each of the cue words 110, 112 with a morphological analyzer/generator to determine one or more inflectional variants of each of the cue words 110, 112. Thus, in the example where the Cue Word #1 110 is the word "letter," inflectional variants "lettered," "letters," and "lettering," among others, may be determined for the Cue Word #1 110. Each inflectional variant of the Cue Word #1 110 may be searched across the entries of the dataset 116 to determine additional candidate words that are associated with the Cue Word #1 110. The larger number of candidate words generated for the cue words 110, 112 may increase the probability that an intended target word or words is returned by the system 104.

As described above, the candidate words 120 may be words associated with the Cue Word #1 110, and the candidate words 122 may be words associated with the Cue Word #2 112. After generating these candidate words 120, 122, candidate words that are associated with all of the cue words 110, 112 may be selected. Candidate words that are not associated with all of the cue words 110, 112 may be discarded or removed from further consideration. In FIG. 1B, the candidate words 120, 122 may be filtered via a filter 124 to yield Candidate Words A, B, and C 126, 128, 130. Each of the candidate words 126, 128, 130 may be associated with both the Cue Word #1 110 and the Cue Word #2 112. It should be appreciated that elements of the system 104 described herein with reference to FIGS. 1A and 1B may be implemented in software, in an example. Thus, the candidate word generator 114 may comprise software including computer executable instructions that command a processing system to search the cue words 110, 112 across entries of the dataset 116. Similarly, the filter 124 may comprise software including computer executable instructions that command the processing system to select candidate words that are associated with all of the cue words 110, 112.

For each of the selected candidate words 126, 128, 130, a statistical association score 132 may be determined between the candidate word and each of the cue words 110, 112 using numerical values of the dataset 116. As shown in FIG. 1B, for example, for the Candidate Word C 130, a first score may be a statistical association score between the Candidate Word C 130 and the Cue Word #1 110, and a second score may be a statistical association score between the Candidate Word C 130 and the Cue Word #2 112. The determination of statistical association scores between a candidate word and a cue word is described in greater detail below with reference to FIG. 6.

In an example, a statistical association score may be determined by processing with the processing system a frequency count included in an entry of the dataset 116, where the English words of the entry include (i) the candidate word, and (ii) the cue word. Thus, for example, to determine a statistical association score between the Candidate Word A 126 and the Cue Word #1 110, an entry of the dataset 116 including the Candidate Word A 126 and the Cue Word #1 110 may be located. The entry may include a frequency count indicating a number of times that the Candidate Word A 126 and the Cue Word #1 110 appear together as an adjacent word pair in a text corpus or a number of times that the Candidate Word A 126 and the Cue Word #1 110 appear together within respective paragraphs of the text corpus. The frequency count may be processed using the processing system to determine a probability p(A, B) of the Candidate Word A 126 and the Cue Word #1 110 appearing together as an adjacent word pair in a well-formed text or appearing together within a paragraph of a well-formed text. The probability p(A, B) may then be processed using the processing system to determine the statistical association score between the Candidate Word A 126 and the Cue Word #1 110. In examples, the statistical association score may be a Pointwise Mutual Information value, a Normalized Pointwise Mutual Information value, or a Simplified Log-Likelihood value. Such statistical association scores are described in further detail below.

For each of the candidate words 126, 128, 130, the determined statistical association scores between the candidate word and each of the cue words 110, 112 are combined into an aggregate score. Thus, for example, Candidate Word A 126 is shown as being associated with two statistical association scores, i.e., one score for the Candidate Word A 126 and the cue word 110, and one score for the Candidate Word A 126 and the cue word 112. These statistical association scores are combined into an aggregate score for the Candidate Word A 126. After determining the aggregate scores for each of the candidate words 126, 128, 130, one or more of the candidate words 126, 128, 130 may be selected as the one or more target words 106, i.e., the words that are determined to have a lexical relationship with the plurality of candidate words 110, 112. A user of the system would then be able to review the one or more target words 106 to evaluate whether the words 106 include the intended, tip-of-the-tongue word, as in the tip-of-the-tongue application described above.

The system 104 described herein may be an automated system for determining one or more target words that are strongly related to a plurality of cue words. The automated system may require no human intervention or only minimal human intervention. It should be appreciated that under the approaches described herein, one or more computer-based datasets or databases may be used in determining the one or more target words. Such datasets or databases may comprise thousands, millions, or billions of entries including statistical information about pairs of English words (e.g., probability values and/or frequency counts as described above) and other data. Under the computer-based approaches described herein, cue words may be searched across the thousands, millions, or billions of entries to determine a plurality of candidate words and statistical information associated with each of the candidate words.

By contrast, conventional human techniques for determining target words that have a lexical relationship to a plurality of cue words include none of these steps. Such conventional human techniques involve one or more humans thinking about the cue words (e.g., the words related to the intended, unknown "tip-of-the-tongue" word, such as "dark," "coffee," "beans," "Arabia," in the example described above) and attempting to use these words to determine the intended, unknown words. The conventional human techniques would not include the aforementioned datasets or databases with thousands, millions, or billions of entries containing statistical information about pairs of words in English.

In an example, the computer-based system described herein may be tested using data from the Edinburgh Associative Thesaurus (EAT). For each of approximately 8,000 stimulus words, the EAT lists words (e.g., associations) provided by human respondents, sorted according to the number of respondents that provided the respective word. Data of the EAT may thus have been generated by asking human respondents, "What English word comes to mind given the stimulus word X?" Generally, if more human respondents provided the same word, the word is considered to have a higher association with the stimulus word. In testing the computer-based system described herein, the EAT may be used to provide sets of cue words to the system. In an example, a set of cue words provided to the system includes the five strongest responses to a stimulus word, and the task of the system is to determine the stimulus word, which is unknown to the system. In testing the computer-based system, the stimulus word of the EAT entry may be known as the "gold-standard word," and the system may be tested by evaluating whether the gold-standard word is included in the one or more target words generated by the system. It should be appreciated that in other examples, sets of cue words provided to the system come from other sources. For example, a human searching for an unknown tip-of-the-tongue word may provide to the system a plurality of related words that come to mind (e.g., "dark," "coffee," "beans," "Arabia," in the example described above), and the task of the system is to determine the unknown tip-of-the-tongue word. Cue words may come from various other sources (e.g., thesauri, dictionaries, etc.).

Figure 2:
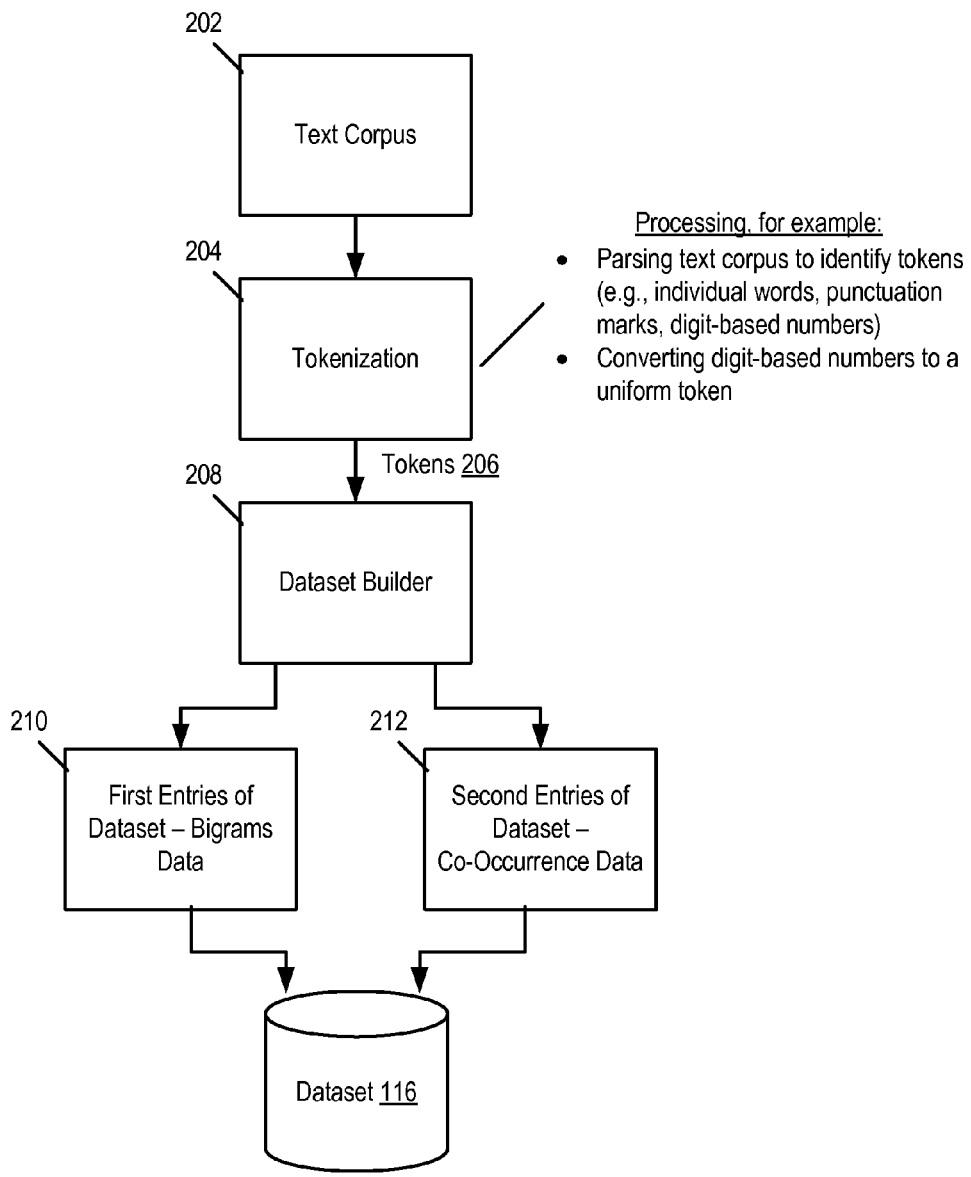
FIG. 2 is a block diagram depicting aspects of the generation of the dataset of FIG. 1B.

FIG. 2 is a block diagram depicting aspects of the generation of the dataset 116 of FIG. 1B. As described above with reference to FIG. 1B, determining candidate words that are associated with a cue word may include searching the cue word across entries of a dataset 116. The dataset 116 may include statistical lexical information derived from a corpus of documents. Thus, to generate the dataset 116, a text corpus 202 may be utilized. The text corpus 202 may be, in general, a large collection of text written in English, and the text corpus 202 may include documents from one or more sources. In one example, the text corpus 202 may include the English Gigaword 2003 corpus known to persons of ordinary skill in the art. The English Gigaword 2003 corpus may include approximately 1.7 billion tokens. The English Gigaword 2003 corpus may include, for example, text from the Associated Press, New York Times, and other news agencies or newspapers, among other text. The text corpus 202 may further include an additional 500 million word tokens from another source containing texts from the genres of fiction and popular science (e.g., popular science magazines). The text corpus 202 is not limited to such sources. In another example, the entirety of the text of the website Wikipedia may serve as the text corpus 202 or be included in the text corpus 202.

The text of the text corpus 202 may be processed at tokenization module 204. In an example, at 204, the text corpus 202 is processed with a processing system to identify a plurality of tokens 206 included in the text corpus 202. The tokens 206 may include, for example, individual words, punctuation marks, and digit-based numbers of the text corpus 202. Additional processing performed by the processing system at 204 may include converting all tokens comprising digit-based numbers (e.g., "5," "2," "1," etc.) to a single, uniform token (e.g., the symbol "#"). In an example, all punctuation is retained and counted as tokens, and all tokens including letters are converted to lowercase. The tokenization performed at the tokenization module 204 may be carried out using conventional automated, computer-based algorithms known to those of ordinary skill in the art.

In the example of FIG. 2, the resulting tokens 206 are received at a dataset builder 208. At the dataset builder 208, the tokens 206 may be processed with the processing system to determine the entries of the dataset 116. As shown in FIG. 2, the tokens 206 may be processed to determine first and second entries 210, 212 of the dataset 116. The first entries 210 of the dataset 116 may include bigram data, where a bigram is a sequence of two adjacent tokens (i.e., an n-gram where n=2). Entries of the first entries 210 may include (i) a sequence of two English words (e.g., a bigram), and (ii) a numerical value that is associated with the sequence, the numerical value indicating a probability of the sequence appearing in a well-formed text. In an example, the numerical values of the first entries 210 may be first frequency counts, with each first frequency count indicating a number of times that the sequence appears in the text corpus 202. In this example, the tokens 206 of the text corpus 202 may be processed with the processing system to identify all bigrams included in the tokens 206 and store frequency counts for each of the identified bigrams.

As noted above, the processing of the tokens 206 may also result in the generation of the second entries 212 of the dataset 116. The second entries 212 may include co-occurrence data that implements a first-order co-occurrence word-space model, also known as a Distributional Semantic Model (DSM). Entries of the second entries 212 may include (i) first and second English words, and (ii) a numerical value that is associated with the first and second English words, the numerical value indicating a probability of the first and second English words appearing together within a paragraph in a well-formed text. In an example, the numerical values of the second entries 212 may be second frequency counts, with each second frequency count indicating a number of times that the first and second English words appear together within respective paragraphs of the text corpus 202. In this example, the tokens 206 of the text corpus 202 may be processed with the processing system to count non-directed co-occurrence of tokens in a paragraph, using no distance coefficients. Counts for 2.1 million word form types, and the sparse matrix of their co-occurrences, may be compressed using a toolkit (e.g., the Trendstream toolkit known to persons of ordinary skill in the art), resulting in a database file of 4.7 GB, in an embodiment.

For the generation of co-occurrence statistics, examples described herein are based on co-occurrence of words within paragraphs, as described above. In other examples, however, co-occurrence statistics may be generated using different approaches. For instance, in other examples, co-occurrence statistics may be gathered by counting co-occurrence in a "moving window" of k words, where k may vary. Thus, although embodiments of the present disclosure utilize "in paragraph" co-occurrence data, it should be understood that the present disclosure is not limited to the use of such data and that other approaches to gathering co-occurrence data (e.g., the moving window approach, etc.) may be used in the systems and methods described herein.

As shown in FIG. 2, the first and second entries 210, 212 may be included in the dataset 116. The dataset 116 may include additional other data that is generated by the processing of the text corpus 202 or the tokens 206. For example, the tokens 206 of the text corpus 202 may be processed with the processing system to identify all unigrams included in the tokens 206 and store frequency counts for each of the identified unigrams. The dataset 116 may be configured to allow for fast retrieval of word probabilities for pairs of words (e.g., probability p(A, B), described in further detail below) and statistical association scores for pairs of words (e.g., PMI, NPMI, and SLL values, described in further detail below). The dataset 116 (which may comprise the Trendstream toolkit known to persons of ordinary skill in the art) may support compression and storage for large-scale n-gram models and for large-scale co-occurrence matrices.

In an example, the dataset 116 may store frequency counts, as described above, and word probabilities and statistical association scores may be computed on-the-fly during data retrieval. The computation of such word probabilities and statistical association scores are described in further detail below. In other examples, the dataset 116 may store statistical information other than frequency counts. For example, the dataset 116 may store first entries 210, where each entry of the first entries 210 may include (i) a sequence of two English words, and (ii) a probability p(A, B) of the sequence appearing in a well-formed text or a statistical association score associated with the sequence (e.g., PMI, NPMI, and/or SLL values for the sequence, described in further detail below). In this example, frequency counts for the sequences may or may not be included in the first entries 210. Further, for example, the dataset 116 may store second entries 212, where each entry of the second entries 212 may include (i) first and second English words, and (ii) a probability p(A, B) of the first and second English words appearing together within a paragraph in a well-formed text or a statistical association score associated with the first and second English words (e.g., PMI, NPMI, and/or SLL values for the first and second English words, described in further detail below). In this example, frequency counts may or may not be included in the second entries 212.

Figure 3A:
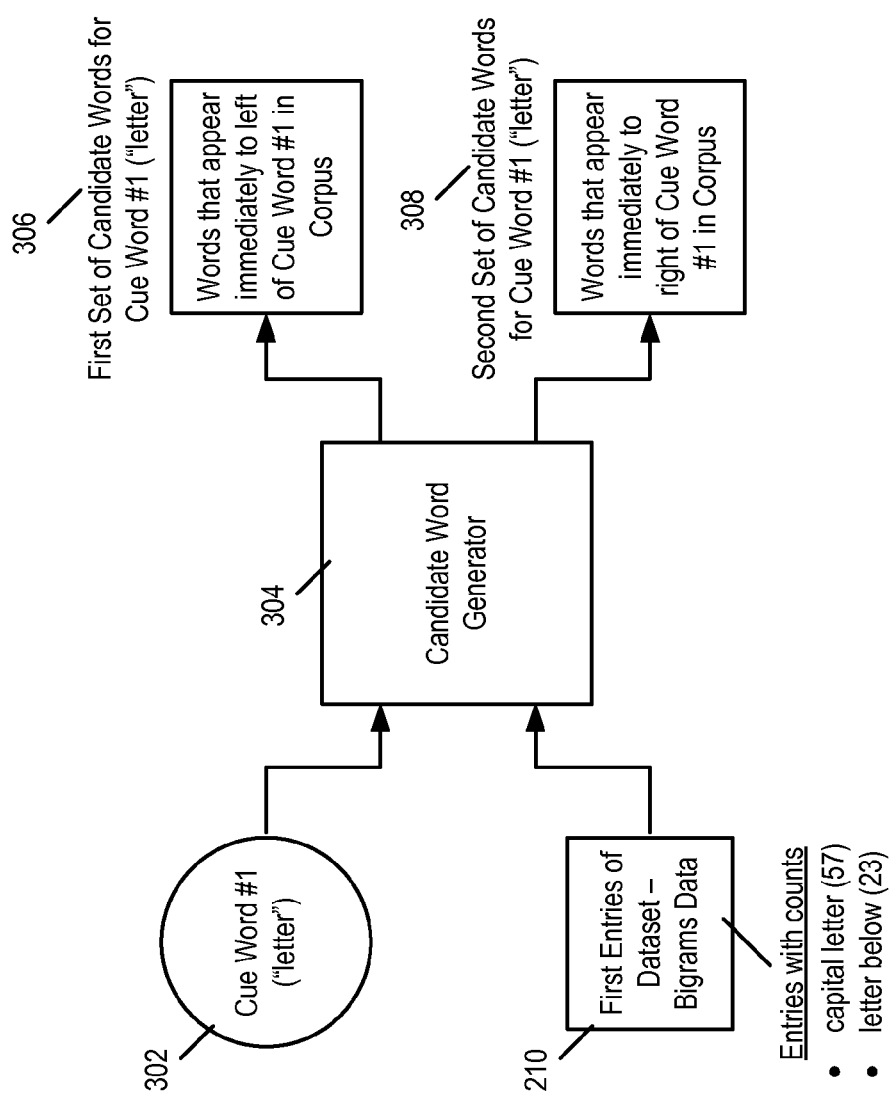
FIGS. 3A and 3B are block diagrams depicting details of a determination of first, second, and third sets of candidate words that are associated with a cue word.
Figure 3B:
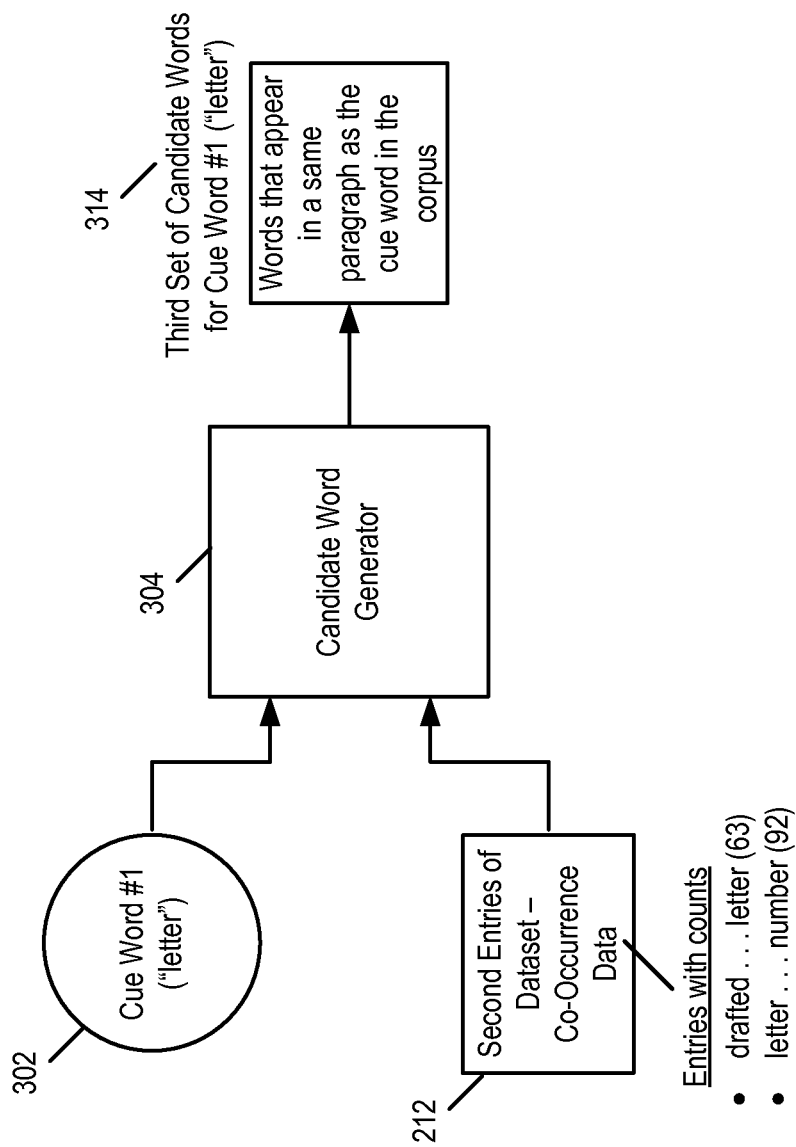

After generating the dataset 116 in the manner described above, candidate words may be determined by searching cue words across entries of the dataset 116. FIGS. 3A and 3B are block diagrams depicting details of a determination of first, second, and third sets 306, 308, 314 of candidate words that are associated with a cue word 302. To generate the first and second sets 306, 308 of candidate words that are associated with the cue word 302, the cue word 302 and the first entries 210 of the dataset 116 may be analyzed with the processing system. As described above, the first entries 210 of the dataset 116 may include bigram data, where each entry of the first entries 210 may include (i) a bigram, and (ii) an associated numerical value that indicates a probability of the bigram appearing in a well-formed text.

To determine the first and second sets of candidate words 306, 308 for the cue word 302, the cue word 302 may be searched across the first entries 210. The searching of the cue word 302 across the first entries 210 may return entries containing the cue word 302. In the example of FIG. 3A, where the cue word 302 is "letter," the searching of the cue word 302 across the first entries 210 may return entries containing the bigrams "capital letter" and "letter below," as illustrated in the figure. Additional other entries containing bigrams that include the word "letter" may be returned. Based on this searching, the word "capital" may be determined to be a candidate word of the first set 306 of candidate words, where the first set 306 includes words that appear immediately to the left of the cue word 302 in the text corpus 202. The word "below" may be determined to be a candidate word of the second set 308 of candidate words, where the second set 308 includes words that appear immediately to the right of the cue word 302 in the text corpus 202.

In an example, a candidate word generator module 304 retrieves right and left co-occurrence vectors for the cue word 302. Given the cue word 302, the left co-occurrence vector may contain all word-forms that appeared in the corpus 202 immediately preceding the cue word 302. Similarly, the right co-occurrence vector may contain all word-forms that appeared in the corpus 202 immediately following the cue word 302. The left co-occurrence vector may include the candidate words of the first set 306 of candidate words, and the right co-occurrence vector may include the candidate words of the second set 308 of candidate words.

To generate the third set 314 of candidate words that are associated with the cue word 302, the cue word 302 and the second entries 212 of the dataset 116 may be analyzed with the processing system. As described above, the second entries 212 may include co-occurrence data, with each entry of the second entries 212 including (i) first and second English words, and (ii) an associated numerical value indicative of a probability of the first and second English words appearing together within a paragraph in a well-formed text. To determine the third set of candidate words 314 for the cue word 302, the cue word 302 may be searched across the second entries 212. The searching of the cue word 302 across the second entries 212 may return entries containing the cue word 302. In the example of FIG. 3B, where the cue word 302 is "letter," the searching of the cue word 302 across the second entries 212 may return entries containing the first and second English words "drafted/letter" and "letter/number," among others. Based on this searching, the words "drafted" and "number" are determined to be candidate words of the third set 314 of candidate words, where the third set 314 includes words that appear in a same paragraph as the cue word 302 in the text corpus 202.

In an example, given a query including the cue word 302, the candidate word generator module 304 retrieves a single vector of words that co-occur with the cue word 302 in paragraphs of text in the corpus 202. Such a vector can be quite large, including hundreds, thousands, or millions of co-occurring words. In an example, a filter may be implemented to reduce the number of candidate words in the third set 314. For example, the filter may filter out any candidates that are punctuation or "#" strings, such that the third set 314 includes only word-forms (e.g., alphabetic strings). Although the example of FIGS. 3A and 3B illustrates the generation of first, second, and third sets 306, 308, 314 of candidate words for the single cue word 302, it should be appreciated that this procedure is repeated for all cue words. Thus, with reference to FIG. 1B, where two cue words 110, 112 are utilized, first, second, and third sets 306, 308, 314 of candidate words are generated for each of the cue words 110, 112.

Figure 4:
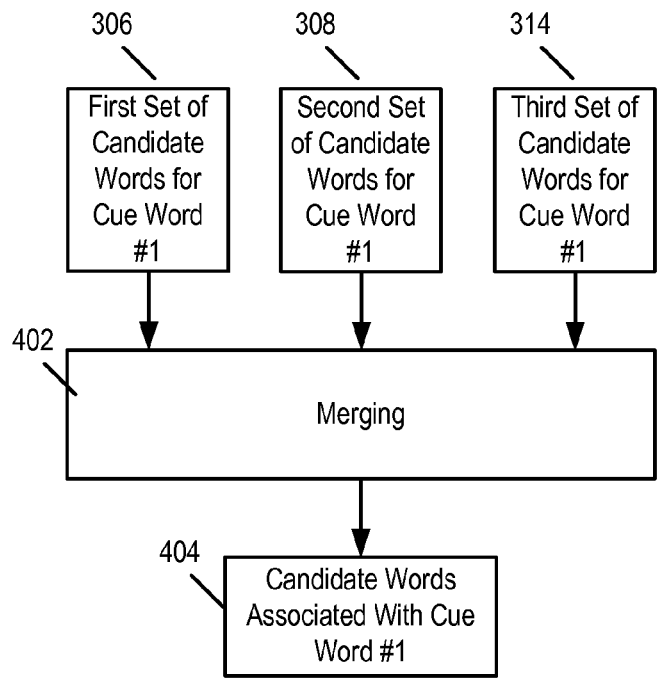
FIG. 4 depicts a merging of the first, second, and third sets of candidate words of FIGS. 3A and 3B.
Figure 5:
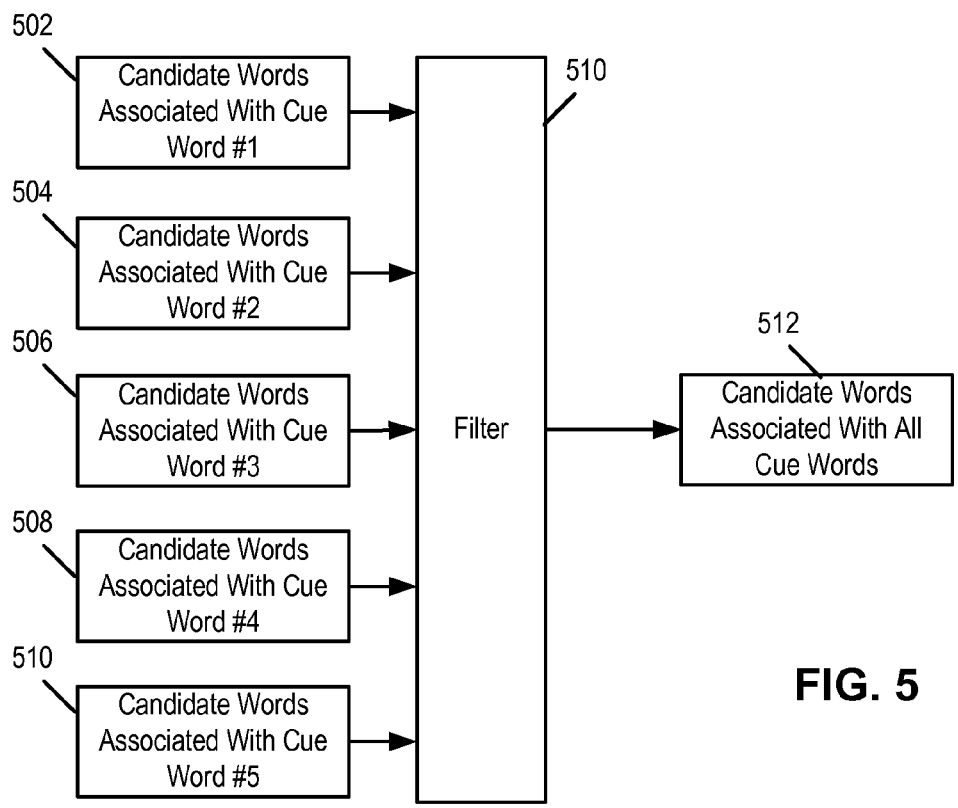
FIG. 5 depicts a filtering of candidate words, where the filtering discards candidate words that are not associated with each of a plurality of cue words.

Following the generation of the first, second, and third sets 306, 308, 314 of candidate words for a cue word, the sets 306, 308, 314 may be merged with the processing system to generate a single set of candidate words that are associated with the cue word. Such a merging is shown in FIG. 4, which depicts a merging module 402 merging the sets of candidate words 306, 308, 314 for the cue word 302 to determine the candidate words 404 that are associated with the cue word 302. Following this merging, candidate words that are associated with all of the cue words are selected (e.g., candidate words that are not associated with all of the cue words are discarded or removed from further consideration). In an example, a system for generating multi-cue associations (e.g., the system 104 of FIG. 1A) may receive five cue words and generate one or more target words that are strongly related to the five cue words. With reference to FIG. 5, candidate words 502, 504, 506, 508, 510 may be generated for each of the five cue words in the manner described above with reference to FIGS. 3A-4. A selection of candidate words that are associated with all of the five cue words is illustrated in FIG. 5. As shown in the figure, the candidate words 502, 504, 506, 508, 510 are received at a filter 510, and only candidate words 512 that are associated with all five cue words are retained.

In examples, the candidate words 512 may undergo further filtering. In an example, stopwords included in the candidate words 512 may be removed. A list of 87 common English stopwords may be used, including articles (e.g., "the," "a," "an,"), common prepositions, pronouns, and wh-question words, among others. Candidate words that match a stopword of the list of English stopwords are removed and not subject to further processing. In an example, it is determined if the plurality of cue words includes a stopword, and based on a determination that the plurality of cue words does not include a stopword, candidate words that are stopwords are removed. In this example, based on a determination that at least one of the cue words is a stopword, the list of stopwords is not used to filter candidate words. It is noted that such filtering of candidate words may occur at different points in the process. For example, filtering need not be applied to the candidate words 512, i.e., the candidate words determined to be associated with all cue words. In other examples, the filtering may be applied immediately after candidate words are determined (e.g., prior to the merging of candidate words as illustrated in FIG. 4 and/or prior to the filtering of candidate words as illustrated in FIG. 5).

In another example, a filter is used to filter words based on the frequency at which they appear in the text corpus 202. The filter may be used to drop candidate words that have a low frequency within the text corpus 202. In another example, the filter may be used to drop candidate words based on a joint frequency of the candidate word and a cue word in the text corpus 202. For example, a candidate word may be dropped if corpus data from the text corpus 202 indicates that it co-occurs with the cue word less than 10 times in the text corpus 202. Thus, for a candidate word determined based on the first entries 210 of the dataset 116 (e.g., the bigrams data), the candidate word may be dropped if it co-occurs with the cue word as a bigram less than a threshold number of times in the text corpus 202. For a candidate word determined based on the second entries 212 of the dataset 116 (e.g., the paragraph co-occurrence data), the candidate word may be dropped if it co-occurs with the cue word in paragraphs less than a threshold number of times in the text corpus 202.

Figure 6:
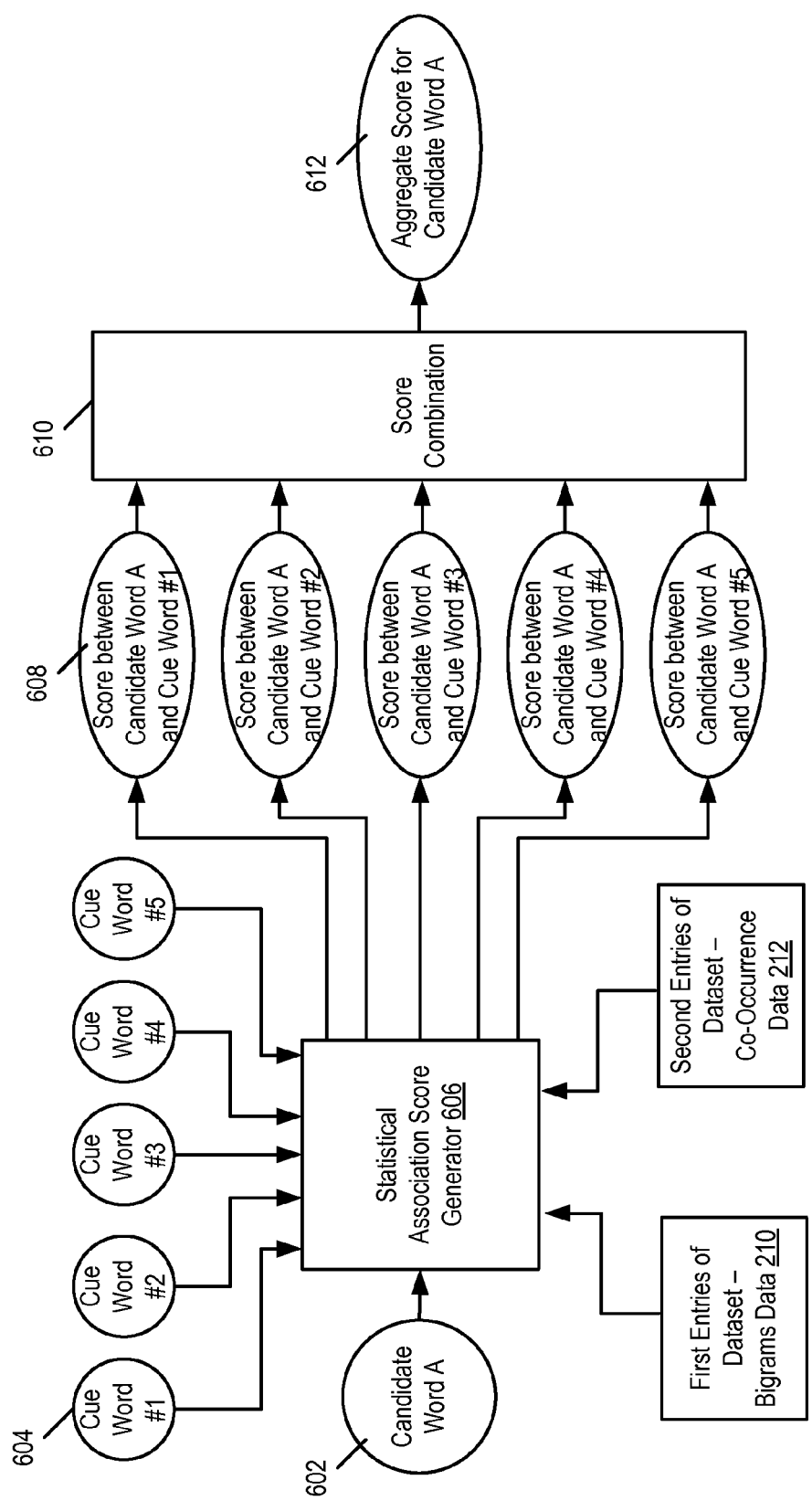
FIG. 6 depicts aspects of a generation of an aggregate score for a Candidate Word A, the Candidate Word A being a candidate word not discarded in the filtering depicted in FIG. 5.

For each candidate word 512 (i.e., for each candidate word that is associated with all of the cue words), a statistical association score may be determined between the candidate word and each of the cue words using numerical values of the dataset 116. FIG. 6 depicts a generation of such statistical association scores for a Candidate Word A 602, the Candidate Word A 602 being a candidate word of the candidate words 512 in FIG. 5. As shown in FIG. 6, a statistical association score generator 606 may receive the Candidate Word A 602 and all of the cue words 604. In the example of FIG. 6, the system for generating multi-cue associations utilizes five cue words, and all five of these cue words 604 may be received at the statistical association score generator 606. The statistical association score generator 606 may utilize data from the first and second entries 210, 212 of the dataset 116 to generate the five statistical association scores 608. As depicted in FIG. 6, a first score of the scores 608 is a statistical association score between the Candidate Word A 602 and the Cue Word #1, a second score is a statistical association score between the Candidate Word A 602 and the Cue Word #2, and so on.

In an example, one or more of the statistical association scores 608 may be a maximum statistical association score between the Candidate Word A 602 and one of the cue words 604. A maximum statistical association score may be selected from a plurality of determined statistical association scores between the Candidate Word A 602 and the cue word. To illustrate the selection of a maximum statistical association score, reference is made to FIG. 7. This figure depicts a Candidate Word 702 and a Cue Word 704. As is further shown in FIG. 7, there may be three statistical association scores 706, 708, 710 between the Candidate Word 702 and the Cue Word 704. In determining a single statistical association score between the Candidate Word 702 and the Cue Word 704, a maximum of the three scores may be selected and used in subsequent steps described herein.

Figure 7:
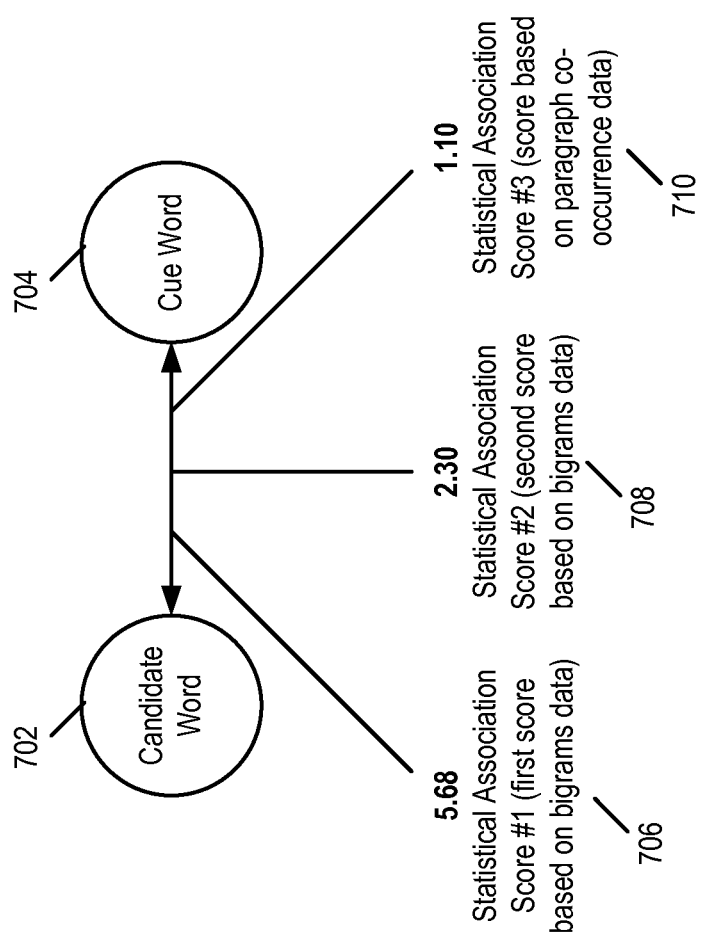
FIG. 7 illustrates a candidate word and cue word having multiple statistical association scores.

As illustrated in FIG. 7, the first statistical association score 706 may be based on the first entries 210 of the dataset 116, i.e., the bigrams data included in the dataset 116. Specifically, an entry of the first entries 210 may indicate that the Candidate Word 702 appears immediately to the left of the Cue Word 704 in the text corpus 202, and the entry may include an associated numerical value (e.g., a frequency count indicating the number of times that this sequence appears in the text corpus). The first statistical association score 706 between the Candidate Word 702 and the Cue Word 704 may be determined based on the numerical value of this entry. Methods for determining the statistical association score based on the numerical value of the entry are described in further detail below.

The second statistical association score 708 may also be based on the first entries 210 of the dataset 116. Specifically, an entry of the first entries 210 may indicate that the Candidate Word 702 appears immediately to the right of the Cue Word 704 in the text corpus 202, and the entry may include an associated numerical value. The second statistical association score 708 between the Candidate Word 702 and the Cue Word 704 may be determined based on the numerical value of this entry.

The third statistical association score 710 may be based on the second entries 212 of the dataset 116, i.e., the paragraph co-occurrence data described above. Specifically, an entry of the second entries 212 may indicate that the Candidate Word 702 appears within a same paragraph as the Cue Word 704 in the text corpus 202, and the entry may include an associated numerical value (e.g., a frequency count indicating the number of times that the Candidate Word 702 and the Cue Word 704 appear together within respective paragraphs of the text corpus 202). The third statistical association score 710 between the Candidate Word 702 and the Cue Word 704 may be determined based on the numerical value of this entry.

In this manner, each candidate word/cue word pair may have multiple statistical association scores. In determining a single statistical association score between the candidate word and cue word for use in subsequent steps (e.g., in determining the statistical association scores 608 of FIG. 6), a maximum of the multiple statistical association scores may be selected. Thus, in the example of FIG. 7, the first statistical association score 706 may be selected as the statistical association score between Candidate Word 702 and the Cue Word 704. It is noted that not every candidate word/cue word pair has three statistical association scores, as depicted in the example of FIG. 7. For example, a candidate word may appear immediately to the left of a cue word in the text corpus 202, but the candidate word may not also appear immediately to the right of the cue word in the text corpus 702. In this example, the candidate word would have a statistical association score based on its status as a "left word" in a bigram included in the first entries 210 but would not have a second score based on the first entries 210. In another example, a candidate word may appear in a same paragraph as a cue word in the text corpus 202, but the candidate word may not also appear as a bigram with the cue word in the text corpus 702. In this example, the candidate word would have a statistical association score based on the paragraph co-occurrence data included in the second entries 212 but would not have a score based on the bigrams data included in the first entries 210.

In an example, each of the scores 706, 708, 710 may be a Pointwise Mutual Information (PMI) value for the Candidate Word 702 and the Cue Word 704. The PMI values are determined according to $$PMI(A, B) = \log_2 \frac{p(A, B)}{p(A)p(B)}, \quad \text{(Equation 1)}$$

Probabilities p(A) and p(B) may be determined using the dataset 116, where the probability p(A) is a probability of the Candidate Word 702 appearing in a well-formed text, and the probability p(B) is a probability of the Cue Word 704 appearing in a well-formed text. As noted above, the dataset 116 may store frequency counts for each unigram identified in the text corpus 202. In examples where the dataset 116 stores such frequency counts, the probability p(A) may be determined based on:

$$p(A) = \frac{Count(A)}{Count(All\ Unigrams)}, \quad \text{(Equation 2)}$$

where Count(A) is a count of the number of times that the unigram Candidate Word 702 appears in the text corpus 202, and Count(All Unigrams) is a count of all unique unigrams appearing in the text corpus 202. Likewise, the probability p(B) may be determined based on:

$$p(B) = \frac{Count(B)}{Count(All\ Unigrams)}, \quad \text{(Equation 3)}$$

where Count(B) is a count of the number of times that the unigram cue word 704 appears in the text corpus 202.

To determine the first PMI score 706, the probability value p(A, B) included in Equation 1 may be determined using the first entries 210 of the dataset 116, i.e., the bigrams data included in the dataset 116, where the probability p(A, B) is a probability of the Candidate Word 702 appearing immediately to the left of the Cue Word 704 in a well-formed text. In examples where the dataset 116 stores frequency counts, the probability p(A, B) may be determined based on:

$$p(A, B) = \frac{Count(A, B)}{Count(All\ Bigrams)}, \quad \text{(Equation 4)}$$

where Count(A, B) is a count of the number of times that the bigram "Candidate_Word_702 Cue_Word_704" appears in the text corpus 202, and Count(All Bigrams) is a count of the number of unique bigrams appearing in the text corpus 202. The probability values p(A) and p(B) (as determined according to Equations 2 and 3) and p(A, B) (as determined according to Equation 4) may be substituted into Equation 1 to determine a first PMI value, where the first PMI value is the first score 706. It should be appreciated that the first statistical association score 706 is based on the first entries 210 of the dataset 116, i.e., the bigrams data included in the dataset 116.

To determine the second PMI score 708, Equation 1 is used again, but the probability value p(A, B) is different than the probability value p(A, B) used in determining the first PMI score 706. Specifically, in utilizing Equation 1 to determine the second PMI score 708, the probability value p(A, B) may be a probability of the Candidate Word 702 appearing immediately to the right of the Cue Word 704 in a well-formed text. The probability value p(A, B) may be determined using the first entries 210 of the dataset 116, i.e., the bigrams data included in the dataset 116. In examples where the dataset 116 stores frequency counts, the probability p(A, B) for determining the second score 708 may be determined based on:

$$p(A, B) = \frac{Count(B, A)}{Count(All\ Bigrams)}, \quad \text{(Equation 5)}$$

where Count(B, A) is a count of the number of times that the bigram "Cue Word 704 Candidate Word 702" appears in the text corpus 202. The probability values p(A) and p(B) (as determined according to Equations 2 and 3) and p(A, B) (as determined according to Equation 5) may be substituted into Equation 1 to determine a second PMI value, where the second PMI value is the second score 708. It should be appreciated that the second statistical association score 708 is based on the first entries 210 of the dataset 116, i.e., the bigrams data included in the dataset 116.

To determine the third PMI score 710, Equation 1 is used again, but the probability value p(A, B) is different than the p(A, B) probability values used in determining the first and second PMI scores 706, 708. Specifically, in utilizing Equation 1 to determine the third PMI score 710, the probability value p(A, B) may be a probability of the Candidate Word 702 and the Cue Word 704 appearing together within a paragraph of a well-formed text. The probability value p(A, B) may be determined using the second entries 212 of the dataset 116, i.e., the paragraph co-occurrence data described above. In examples where the dataset 116 stores frequency counts, the probability p(A, B) may be determined based on:

$$p(A, B) = \frac{\text{Co\_ocurrence\_Count}(A, B)}{\text{Count(All Co\_occurrence Pairs)}}, \quad \text{(Equation 6)}$$

where Co_occurrence_Count(A, B) is a count of the number of times that the Candidate Word 702 and the Cue Word 704 appear in a same paragraph in the text corpus 202, and Count(All Co_occurrence Pairs) is a count of the number of unique paragraph co-occurrence pairs appearing in the text corpus 202. The probability values p(A) and p(B) (as determined according to Equations 2 and 3) and p(A, B) (as determined according to Equation 6) may be substituted into Equation 1 to determine a third PMI value, where the third PMI value is the third score 710. It is noted that the third score 710 is based on the second entries 212 of the dataset 116, i.e., the paragraph co-occurrence data described above.

In another example, each of the scores 706, 708, 710 may be a Normalized Pointwise Mutual Information (NPMI) value for the Candidate Word 702 and the Cue Word 704. The NPMI values may be determined according to $$\frac{\log_2 \frac{p(A, B)}{p(A)p(B)}}{-\log_2 p(A, B)}. \quad \text{Equation 7}$$

Probabilities p(A) and p(B) are determined using the dataset 116, where the probability p(A) is a probability of the Candidate Word 702 appearing in a well-formed text, and the probability p(B) is a probability of the Cue Word 704 appearing in a well-formed text. The probabilities p(A) and p(B) may be determined according to Equations 2 and 3, respectively.

To determine the first NPMI score 706, the probability value p(A, B) included in Equation 7 is determined using the first entries 210 of the dataset 116, i.e., the bigrams data included in the dataset 116, where the probability p(A, B) is a probability of the Candidate Word 702 appearing immediately to the left of the Cue Word 704 in a well-formed text. The probability p(A, B) may be determined according to Equation 4. The probability values p(A) and p(B) (as determined according to Equations 2 and 3) and p(A, B) (as determined according to Equation 4) may be substituted into Equation 7 to determine a first NPMI value, where the first NPMI value is the first score 706.

To determine the second NPMI score 708, Equation 7 is used again, but the probability value p(A, B) is different than the probability value p(A, B) used in determining the first NPMI score 706. Specifically, in utilizing Equation 7 to determine the second NPMI score 708, the probability value p(A, B) is determined using the first entries 210 of the dataset 116, i.e., the bigrams data included in the dataset 116, where the probability value p(A, B) is a probability of the Candidate Word 702 appearing immediately to the right of the Cue Word 704 in a well-formed text. The probability p(A, B) may be determined according to Equation 5. The probability values p(A) and p(B) (as determined according to Equations 2 and 3) and p(A, B) (as determined according to Equation 5) may be substituted into Equation 7 to determine a second NPMI value, where the second NPMI value is the second score 708.

To determine the third NPMI score 710, Equation 7 is used again, but the probability value p(A, B) is different than the p(A, B) probability values used in determining the first and second NPMI scores 706, 708. Specifically, in utilizing Equation 7 to determine the third score 710, the probability value p(A, B) is determined using the second entries 212 of the dataset 116, i.e., the paragraph co-occurrence data included in the dataset 116, where the probability value p(A, B) is a probability of the Candidate Word 702 and the Cue Word 704 appearing together within a paragraph of a well-formed text. The probability p(A, B) may be determined according to Equation 6. The probability values p(A) and p(B) (as determined according to Equations 2 and 3) and p(A, B) (as determined according to Equation 6) may be substituted into Equation 7 to determine a third NPMI value, where the third NPMI value is the third score 710.

In another example, each of the scores 706, 708, 710 may be a Simplified Log-Likelihood (SLL) value for the Candidate Word 702 and the Cue Word 704. The SLL values may be determined according to $$2 * p(A, B) * \log \frac{p(A, B)}{p(A)p(B)} - p(A, B) + p(A)p(B). \quad \text{(Equation 8)}$$

Probabilities p(A) and p(B) may be determined using the dataset 116, where the probability p(A) is a probability of the Candidate Word 702 appearing in a well-formed text, and the probability p(B) is a probability of the Cue Word 704 appearing in a well-formed text. The probabilities p(A) and p(B) may be determined according to Equations 2 and 3, respectively.

To determine the first SLL score 706, the probability value p(A, B) included in Equation 8 may be determined using the first entries 210 of the dataset 116, i.e., the bigrams data included in the dataset 116, where the probability p(A, B) is a probability of the Candidate Word 702 appearing immediately to the left of the Cue Word 704 in a well-formed text. The probability p(A, B) may be determined according to Equation 4. The probability values p(A) and p(B) (as determined according to Equations 2 and 3) and p(A, B) (as determined according to Equation 4) may be substituted into Equation 8 to determine a first SLL value, where the first SLL value is the first score 706.

To determine the second SLL score 708, Equation 8 is used again, but the probability value p(A, B) is different than the probability value p(A, B) used in determining the first SLL score 706. Specifically, in utilizing Equation 8 to determine the second score 708, the probability value p(A, B) may be determined using the first entries 210 of the dataset 116, i.e., the bigrams data included in the dataset 116, where the probability value p(A, B) is a probability of the Candidate Word 702 appearing immediately to the right of the Cue Word 704 in a well-formed text. The probability p(A, B) may be determined according to Equation 5. The probability values p(A) and p(B) (as determined according to Equations 2 and 3) and p(A, B) (as determined according to Equation 5) may be substituted into Equation 8 to determine a second SLL value, where the second SLL value is the second score 708.

To determine the third SLL score 710, Equation 8 is used again, but the probability value p(A, B) is different than the p(A, B) probability values used in determining the first and second SLL scores 706, 708. Specifically, in utilizing Equation 8 to determine the third score 710, the probability value p(A, B) may be determined using the second entries 212 of the dataset 116, i.e., the paragraph co-occurrence data included in the dataset 116, where the probability value p(A, B) is a probability of the Candidate Word 702 and the Cue Word 704 appearing together within a paragraph of a well-formed text. The probability p(A, B) may be determined according to Equation 6. The probability values p(A) and p(B) (as determined according to Equations 2 and 3) and p(A, B) (as determined according to Equation 6) may be substituted into Equation 8 to determine a third SLL value, where the third SLL value is the third score 710.

It is noted that in an example, a same measure of association is used in determining each of the statistical association scores between a candidate word and a cue word. Thus, in the example of FIG. 7, all of the scores 706, 708, 710 are PMI values, or all of the scores 706, 708, 710 are NPMI values, or all of the scores 706, 708, 710 are SLL values (e.g., multiple measures of association are not used within a given experiment). As noted above, a maximum statistical association score may be selected from the scores 706, 708, 710, and the use of the same measure of association in determining all of the scores 706, 708, 710 allows the scores to be numerically comparable (e.g., amenable to comparison). Likewise, with reference again to FIG. 6, a same measure of association may be used in determining each of the statistical association scores 608. Thus, in the example of FIG. 6, all of the scores 608 are PMI values, or all of the scores 608 are NPMI values, or all of the scores 608 are SLL values. The use of the same measure of association in determining all of the scores 608 allows the scores 608 to be numerically comparable (e.g., the scores may be compared).

Figures 8A, 8B:
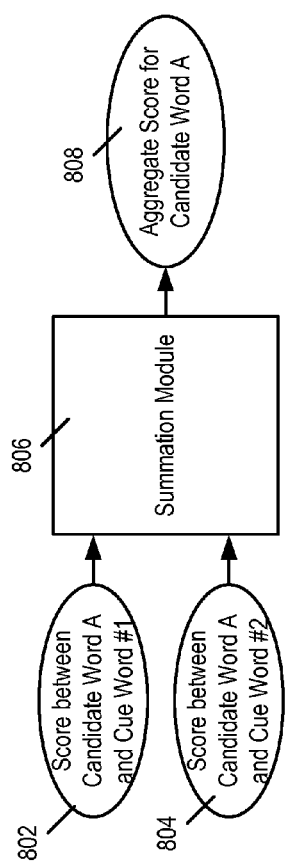
FIGS. 8A and 8B depict aspects of generating an aggregate score for a candidate word.

With reference again to FIG. 6, after computing the statistical association scores 608 between the Candidate Word A 602 and each of the cue words 604 (some of which may be maximum statistical association scores selected among multiple statistical association scores, as described above with reference to FIG. 7), the scores 608 for the Candidate Word A 608 are combined into an Aggregate Score 612 for the Candidate Word A 608 using score combination module 610. The Aggregate Score 612 represents an overall association between Candidate Word A 608 and all five of the cue words 604. FIGS. 8A and 8B depict aspects of generating an aggregate score for a candidate word. Different forms of aggregation may be used in different examples.

A first form of aggregation, which may be referred to as a sum of best scores aggregation, is illustrated in FIG. 8A. In this figure, a statistical association score 802 between a Candidate Word A and Cue Word #1 and a statistical association score 804 between the Candidate Word A and Cue Word #2 are combined via summation module 806. The summation module 806 combines the scores 802, 804 by summing the scores 802, 804, with the sum being the Aggregate Score 808 for the Candidate Word A. Although the example of FIG. 8A illustrates the aggregation of two statistical association scores 802, 804 to determine the Aggregate Score 808, it should be understood that in other examples, a higher number of scores are summed to determine an aggregate score. For example, in the example of FIG. 6, all five of the scores 608 may be summed at the summation module 806 to determine the Aggregate Score 612. The "sum of best scores" aggregation may be referred to as such because each of the scores that is summed may be a best score (e.g., a maximum score) between a candidate word and a cue word. The determination of a maximum statistical association score for a candidate word and a cue word is described above with reference to FIG. 7.

A second form of aggregation, which may be referred to as a multiplication of ranks aggregation, is illustrated in FIG. 8B. In the second form of aggregation, for each cue word, a ranked list of candidates is generated, where each candidate word of the list (i) is ranked based on its association score with the cue word, and (ii) is associated with a rank value based on its order in the list. Ranked lists of candidates 810, 812 are depicted in FIG. 8B. The ranked list of candidates 810 is associated with a Cue Word #1, which may be, for example "beans." In the list 810, candidate words "mocha," "espresso," "cappuccino," and "drink" are ranked based on their association scores with the cue word "beans" and have associated rank values, as illustrated in the figure. In this example, candidate words having a higher association to the cue word have a larger rank value. The ranked list of candidates 812 is associated with a Cue Word #2, which may be, for example, "coffee." In the list 812, the same candidate words (e.g., candidate words determined to be associated with all cue words, as illustrated in FIG. 5 and described above with reference to that figure) are ranked based on their association scores with the cue word "coffee" and have associated rank values.

To determine the aggregate score for a candidate word, the rank values associated with the candidate word are multiplied to generate a product, where the product is the aggregate score for the candidate word. Thus, for example, the candidate word "mocha" has an aggregate score equal to the product (1*3). The best candidate words may have higher aggregate scores in this example. In another example, candidate words having a higher association to the cue word may be given a smaller rank value (e.g., in another embodiment of the list 810, the candidate word "drink" may have a rank of "1," based on its high association to the Cue Word #1), and in this example, the best candidate words may have lower aggregate scores. Although the example of FIG. 8B illustrates the aggregation of two statistical association scores via the multiplication of ranks methodology, it should be understood that in other examples, a higher number of scores are aggregated to determine an aggregate score. For example, in the example of FIG. 6, where five cue words 604 are utilized, five ranked lists of candidate words may be generated (i.e., one for each of the cue words 604), and for each candidate word included in the lists, the five rank values associated with the candidate word may be multiplied to generate a product that is the aggregate score for the candidate word.

After determining an aggregate score for each of the candidate words (e.g., each of the candidate words 512 determined to be associated all cue words), candidate words are sorted according to their aggregate scores. Using the sorted candidate words, one or more of the candidate words are selected as target words, i.e., words that are determined to have a lexical relationship to the plurality of provided cue words. With reference to FIG. 1A, the candidate word "mocha" may be the candidate word determined to have the highest aggregate score and thus may be selected as the target word 106. Although the example of FIG. 1A illustrates a selection of a single target word, in other examples, N (e.g., 25) candidate words having the highest aggregate scores are selected as being target words. In an example, the one or more target words are processed with a processing system to determine one or more inflectional variants for each of the target words. In this example, the target words and their associated inflectional variants may be output. Thus, in an example implementation of the approaches described herein, a user query may include multiple cue words (e.g., multiple cue words 102 illustrated in FIG. 1A), and in response to this user query, one or more target words and the inflectional variants thereof may be output. The determination of the inflectional variants may be carried out using conventional automated, computer-based algorithms known to those of ordinary skill in the art. Such automated, computer-based algorithms may implement a morphological analyzer/generator.

In an example, candidate words are generated based on both bigrams data and paragraph co-occurrence data. Thus, for example, with reference to FIGS. 2-3B, bigrams data 210 and paragraph co-occurrence data 212 may be included in the dataset 116, and this data 210, 212 may be used to generate candidate words 306, 308, 314. As described above, candidate words 306 may be words that appear immediately to the left of a cue word in the text corpus 202; candidate words 308 may be words that appear immediately to the right of a cue word in the text corpus 202; and candidate words 314 may be words that appear in a same paragraph as a cue word in the text corpus 202. The candidate words 306, 308, 314 determined via the multiple resources (e.g., bigrams data and paragraph co-occurrence data) may be utilized in determining the one or more target words.

Figure 8C:
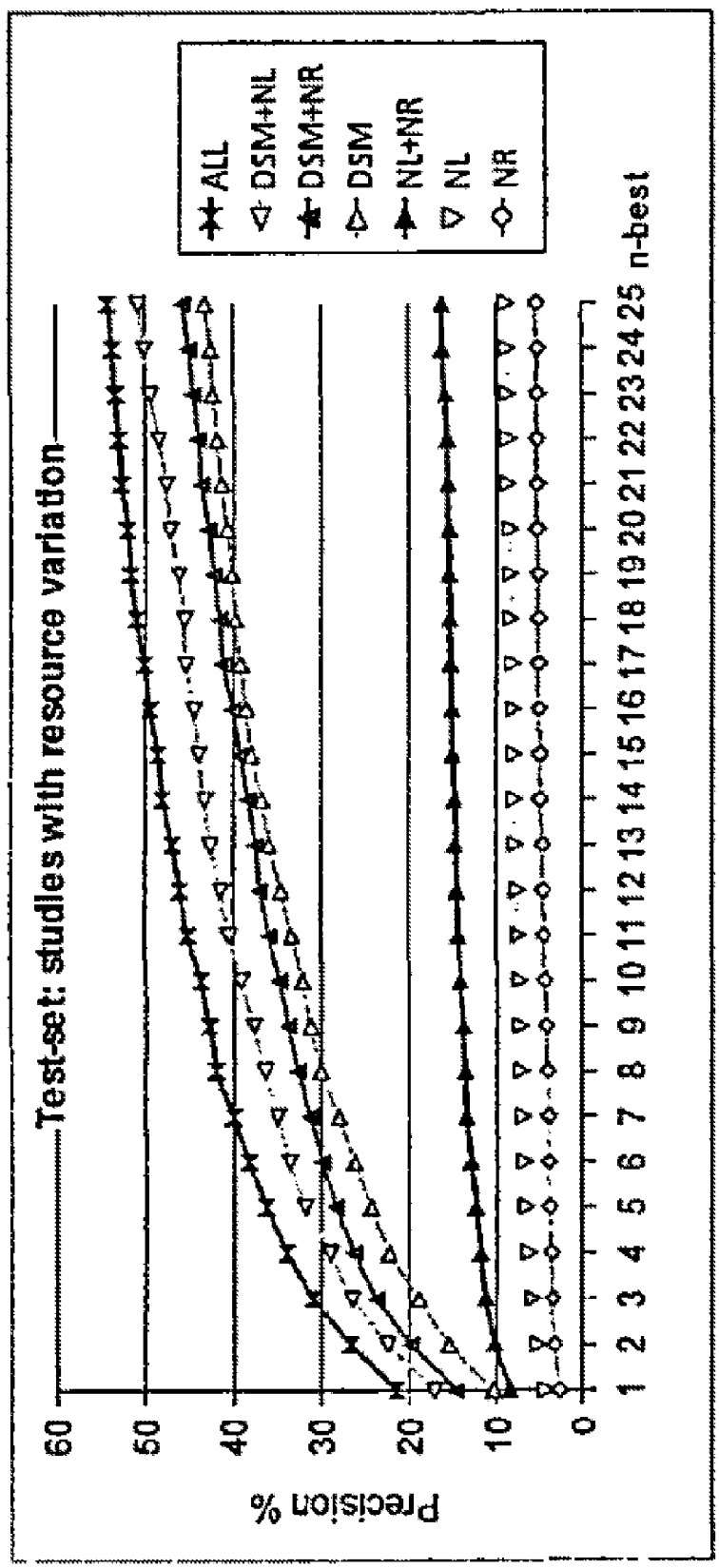
FIG. 8C illustrates an effect of restricting resources used in generating candidate words, in an example experiment.

In other examples, however, the resources used to generate candidate words may be restricted. FIG. 8C illustrates the effect of restricting the resources used in generating the candidate words, in an example experiment. FIG. 8C depicts a graph, where the x-axis represents a number N of target words that are returned in response to a query containing multiple cue words, and the y-axis represents precision, i.e., a percentage of times in which a gold-standard word is included in the N target words returned by the system, where the system was provided a test set of 2,000 items, with each item comprising multiple cue words and a gold-standard word that is unknown to the system. In an example, each item is based on an entry from the Edinburgh Associative Thesaurus (EAT) described above, where the multiple cue words are the five strongest responses to a stimulus word in an EAT entry, and the gold-standard word is the stimulus word of the entry. In a first condition, only bigrams data is used, and only words that appear immediately to the left of cue words in the text corpus 202 are retrieved as candidate words. This first condition is represented as condition "NL" (i.e., n-grams left) on the graph of FIG. 8C. In a second condition, only bigrams data is used, and only words that appear immediately to the right of cue words in the text corpus 202 are retrieved as candidate words. This second condition is represented as condition "NR" (i.e., n-grams right) on the graph of FIG. 8C. In a third condition, only bigrams data is used, and words that appear immediately to the left of cue words in the text corpus 202 and words that appear immediately to the right of cue words in the text corpus 202 are retrieved as candidate words. This third condition is represented as condition "NL+NR" on the graph of FIG. 8C.

In a fourth condition, only paragraph co-occurrence data is used (i.e., bigrams data is not used), and words that appear in the same paragraph as cue words in the text corpus 202 are retrieved as candidate words. This fourth condition is represented as condition "DSM" (i.e., Distributional Semantic Model) on the graph of FIG. 8C. In a fifth condition, both bigrams data and paragraph co-occurrence data are used, and candidates determined via the paragraph co-occurrence data are combined with "n-grams left" candidates. This fifth condition is represented as "DSM+NL" on the graph of FIG. 8C. In a sixth condition, both bigrams data and paragraph co-occurrence data are used, and candidates determined via the paragraph co-occurrence data are combined with "n-grams right" candidates. This sixth condition is represented as "DSM+NR" on the graph of FIG. 8C. A seventh condition is the condition described above, with reference to FIGS. 2-3B, where candidates determined via the paragraph co-occurrence data are combined with both "n-grams left" and "n-grams right" candidates. This seventh condition is represented as "ALL" on the graph of FIG. 8C.

In the example experiment of FIG. 8C, the NPMI association measure is used with multiplication of ranks aggregation. As shown in FIG. 8C, using both NL and NR candidates, as shown by the "NL+NR" curve, may provide better performance than using only NL or only NR candidates. Performance for "DSM" alone is better than "NL+NR" in the example experiment of FIG. 8C. Performance for "DSM+NL," "DSM+NR," and "ALL" are better than "DSM" alone in the example experiment of FIG. 8C, thus indicating that association values from bigrams contribute substantially to overall performance. The present inventors have identified this as an unexpected result, given that the use of bigrams data only may result in relatively low performance.

Figure 9:
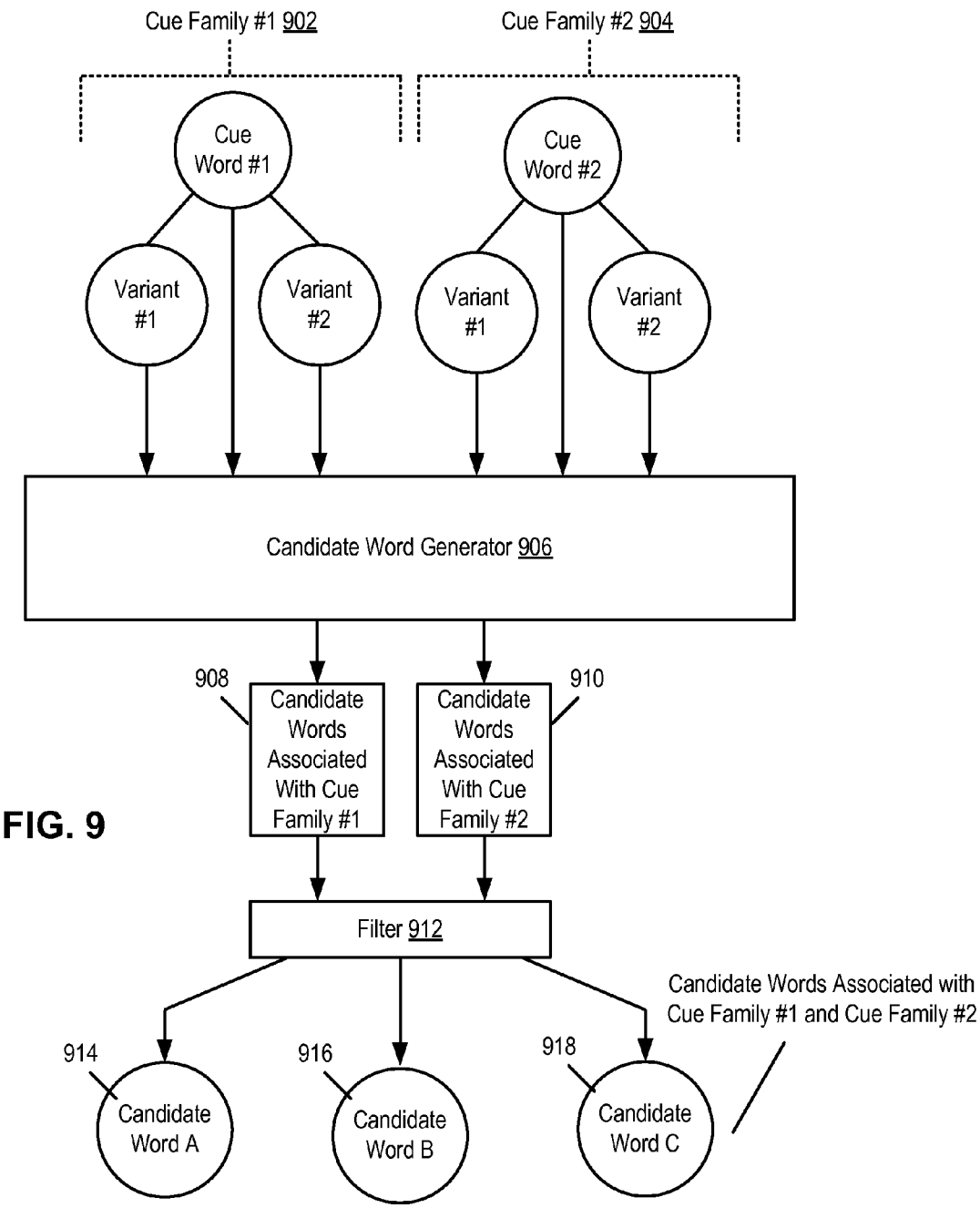
FIG. 9 depicts an example system for determining one or more target words that are strongly related to a plurality of cue words, where each of the cue words is expanded into a cue family.

FIG. 9 depicts an example system for determining one or more target words that are strongly related to a plurality of cue words, where each of the cue words is expanded into a cue family. In this example, the candidate word retrieval process may be extended by expanding the cue words to their inflectional variants. Thus, for each of the cue words, associated inflectional variants may be determined using conventional automated, computer-based algorithms known to those of ordinary skill in the art. Such automated, computer-based algorithms may implement a morphological analyzer/generator. In an example, inflectional variants are not constrained for part of speech or meaning. For example, given the cue set {1: letters, 2: meaning, 3: sentences, 4: book, 5: speech}, the first cue word may be expanded into a first cue family including the words "letters, "lettered," "letter," and "lettering;" the second cue word may be expanded into a second cue family including the words "meaning," "means," "mean," "meant," and "meanings;" the third cue word may be expanded into a third cue family including the words "sentences," "sentence," "sentenced," and "sentencing;" the fourth cue word may be expanded into a fourth cue family including the words "book," "books," "booking," and "booked;" and the fifth cue word may be expanded into a fifth cue family including the words "speech" and "speeches." In the example of FIG. 9, inflectional variants of a Cue Word #1 are determined, and the Cue Word #1 and its inflectional variants comprise a Cue Family #1 902. Similarly, inflectional variants of a Cue Word #2 are determined, and the Cue Word #2 and its inflectional variants comprise a Cue Family #2 904.

As shown in FIG. 9, a candidate word generator 906 may be applied to the cue words and their associated inflectional variants to generate candidate words 908, 910. The candidate words 908 are candidate words that are associated with the Cue Family #1 902, and the candidate words 910 are candidate words that are associated with the Cue Family #2 904. The generation of the candidate words 908, 910 may include analyzing the cue words, the inflectional variants of the cue words, and statistical lexical information derived from a corpus of documents. Such statistical lexical information may be included in a dataset (e.g., the dataset 116 of FIG. 1B). In an example, each member of a cue family (e.g., each of the cue word and its associated inflectional variants) is searched across entries of the dataset to determine candidate words that are associated with the cue family. The searching of words across a dataset to determine candidate words is described above with reference to FIG. 1B, and the determined candidate words may be based on left-bigrams data, right-bigrams data, and paragraph co-occurrence data, as described above. Thus, the Cue Word #1 and its associated inflectional variants are searched across entries of the dataset to determine the candidate words 908, and the Cue Word #2 and its associated inflectional variants are searched across entries of the dataset to determine the candidate words 910. It is noted that the searching of the cue words and the inflectional variants may provide richer information about semantic association, as compared to using only the cue words.

After generating the candidate words 908, 910, candidate words that are associated with all of the cue families 902, 904 are selected. Candidate words that are not associated with all of the cue families 902, 904 are removed from further consideration. Thus, in order to not be filtered out (e.g., discarded or removed) by the filter 912, a candidate word must appear (at least once) on the list of words generated from each of the cue families 902, 904. In FIG. 9, the candidate words 908, 910 are filtered via the filter 912 to yield Candidate Words A, B, and C 914, 916, 918. Each of the candidate words 914, 916, 918 are associated with both the Cue Family #1 902 and the Cue Family #2 904.

For each of the candidate words 914, 916, 918, a highest statistical association score between the candidate word and each of the cue families 902, 904 may be determined. To illustrate the determination of a highest statistical association score between a candidate word and a cue family, reference is made to FIG. 10. In this figure, a cue family is comprised of Cue Word #1 1004 and variants 1006, 1008 of the Cue Word. Statistical association scores 1010, 1012, 1014 between a Candidate Word A 1002 and each of the members of the cue family are determined (e.g., in the manner described above with reference to FIGS. 6 and 7). The statistical association score 1010 may be a maximum statistical association score between the Candidate Word A 1002 and the Cue Word #1 1004. For example, multiple statistical association scores may be determined between the Candidate Word A 1002 and the Cue Word #1 1004 based on left-bigrams data, right-bigrams data, and paragraph co-occurrence data (e.g., as described above with reference to FIG. 7), and the statistical association score 1010 may be the maximum score of these multiple scores. Because a same measure of association (e.g., PMI, NPMI, or SLL) is used in determining the multiple statistical association scores between the Candidate Word A 1002 and the Cue Word #1 1004, the scores may be numerically comparable (e.g., amenable to comparison). In a similar manner, the statistical association score 1012 may be a maximum statistical association score between the Candidate Word A 1002 and the Variant #1 1006, and the statistical association score 1014 may be a maximum statistical association score between the Candidate Word A 1002 and the Variant #2 1008.

Figure 10:
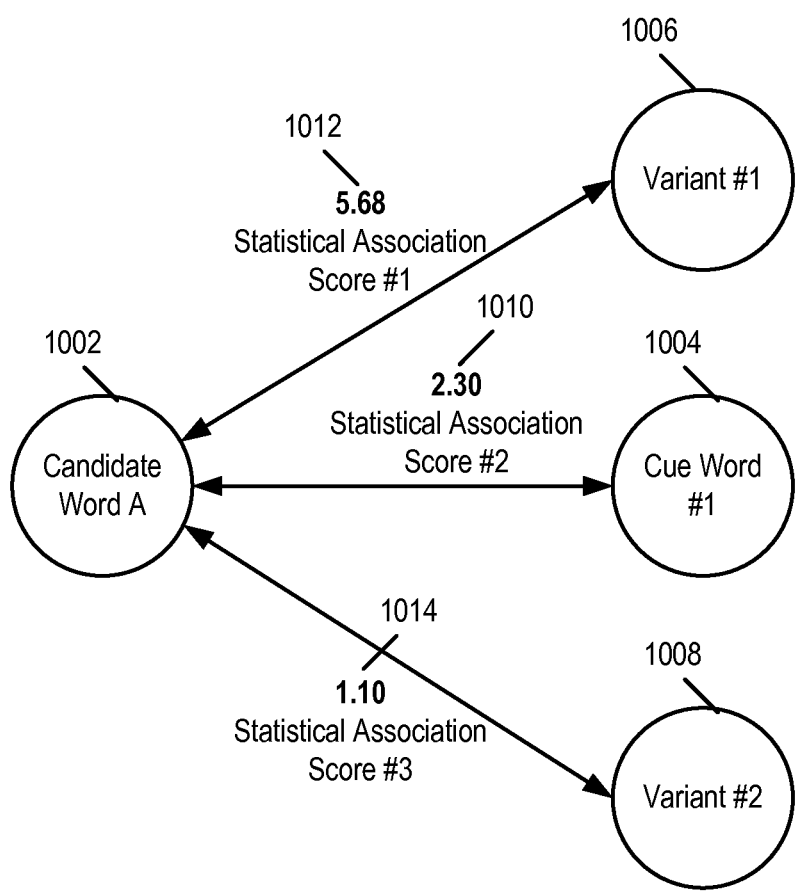
FIG. 10 depicts a candidate word, cue word, and inflectional variants of the cue word.

In determining the highest statistical association score between the Candidate Word A 1002 and the cue family, a maximum of the scores 1010, 1012, 1014 may be selected. Thus, the statistical association scores for the cue word itself and the inflectional variants are compared. In the example of FIG. 10, the statistical association score 1012 may be selected as the statistical association score between the Candidate Word A 1002 and the cue family.

In an example illustrating the determination of a highest statistical association score between a candidate word "capital" and a cue family "letters, lettered, letter, lettering," the following statistical association scores may be determined:

| Candidate Word | Word of Cue Family | Resource | Score |
|---|---|---|---|
| capital | letters | Paragraph Co-occurrence | 0.477 |
| capital | letter | Paragraph Co-occurrence | 0.074 |
| capital | letters | Bigrams Left ("capital letters") | 5.268 |
| capital | letter | Bigrams Left ("capital letters") | −3.131 |

The strongest association for the candidate word "capital" is with the bigram "capital letters," and the value 5.268 is determined to be the best association score of the candidate word "capital" with the cue family.

For each candidate word output by the filter 912, a maximum statistical association score that the candidate word has with each of the cue families is determined. Thus, in the example of FIG. 9, where there are two cue families 902, 904, two maximum statistical association scores are determined for the candidate word 914: (i) a maximum statistical association score between the candidate word 914 and the first cue family 902, and (ii) a maximum statistical association score between the candidate word 914 and the second cue family 904. Likewise, two maximum statistical association scores are determined for each of the candidate words 916, 918.

For each of the candidate words 914, 916, 918, an aggregate score that represents the candidate word's overall association with all of the cue families 902, 904 is determined. In an example, the sum of best scores aggregation approach is used, as described above with reference to FIG. 8A. In the sum of best scores approach, a sum of the best association scores that a candidate word has with each of the multiple cue families is determined. Thus, in the example of FIG. 9, where the candidate word 914 is associated with two maximum statistical association scores, as described above, these maximum statistical association scores are summed to determine the aggregate score for the candidate word 914. To produce a final ranked list of candidate words, candidate words are sorted by their aggregate sum values, with better candidate words having higher sum values. The top N candidate words may be output as the one or more target words that have a lexical relationship to the plurality of cue families.

In another example, the multiplication of ranks approach is used, as described above with reference to FIG. 8B. Under this approach, all candidates are sorted by their association scores with each of the cue families, and multiple rank values are registered for each candidate. In the example of FIG. 9, the candidate words 914, 916, 918 are sorted by their association scores with each of the two cue families, and two rank values are registered for each of the candidate words 914, 916, 918. The rank values associated with a candidate word are then multiplied to produce an aggregate score for the candidate word. All candidate words are then sorted by their aggregate scores, with better candidate words having lower aggregate scores. After sorting the candidate words according to their aggregate scores, the top N candidate words may be output as the one or more target words that are strongly related to the plurality of cue families.

In some examples, the approaches described herein can be applied to yield bigram targets, trigram targets, or more generally, n-gram targets. Thus, although the description above is directed to systems and methods for determining target words (i.e., unigrams) given a plurality of cue words, it should be understood that the system can be applied to yield n-gram targets, generally. To yield n-gram targets, the database or dataset including statistical lexical information derived from a text corpus may be expanded to include additional information. The dataset 116 described above includes bigrams data and paragraph co-occurrence data for pairs of words. The dataset 116 may be expanded to include statistical information for n-grams of the text corpus (e.g., frequency counts or other statistical information on trigrams, four-grams, five-grams, etc). The dataset 116 may also be expanded to include paragraph co-occurrence data for words of a paragraph and n-grams of the paragraph (e.g., each entry may indicate a number of times that a word appeared in a same paragraph with a bigram, trigram, four-gram, five-gram, etc.).

After the dataset 116 is expanded in this manner, searching of the cue words across the entries of the dataset 116 may yield candidates that are n-grams. For example, if the dataset includes statistical information on trigrams, the cue word may be searched across the first and third words of the trigrams. If a match is found, the other two words of the trigram (e.g., the first and second words of the trigram, or the second and third words of the trigram) may be returned as a bigram candidate. Similarly, if the dataset includes statistical information on four-grams, the cue word may be searched across the first and fourth words of the four-grams. If a match is found, the other three words of the four-gram may be returned as a trigram candidate. Likewise, if the dataset includes paragraph co-occurrence data for single words of a paragraph and bigrams of the paragraph, the cue word may be searched across these entries, and bigrams that appear in the same paragraph as the cue word may be returned as bigram candidates.

The candidate n-grams may be processed in a manner similar to the unigram candidates described above. For example, candidate n-grams that are associated with all cue words or cue families may be selected. For each selected candidate n-gram, a statistical association score may be determined between the candidate n-gram and each of the cue words or families based on statistical information from the dataset 116. For each selected candidate n-gram, an aggregate score may be generated based on the statistical association scores. One or more of the candidate n-grams may be selected as target n-grams based on the aggregate scores. It should thus be appreciated that the systems and methods described herein are not limited to returning only target unigrams.

Figure 11:
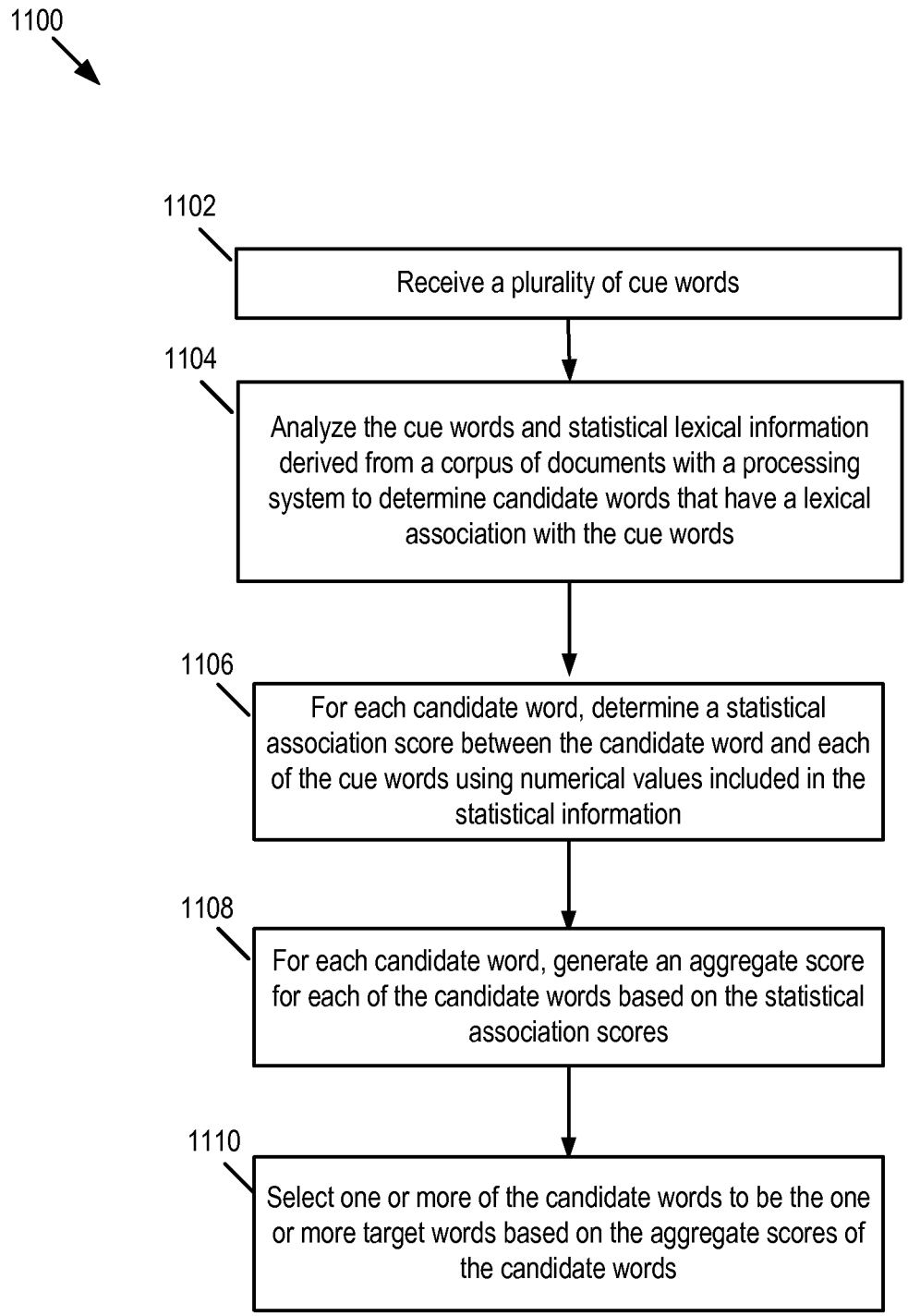
FIG. 11 is a flowchart depicting operations of an example computer-implemented method of identifying one or more target words of a corpus that have a lexical relationship to a plurality of provided cue words.

FIG. 11 is a flowchart depicting operations of an example computer-implemented method of identifying one or more target words of a corpus that have a lexical relationship to a plurality of provided cue words. At 1102, a plurality of cue words are received. At 1104, the cue words and statistical lexical information derived from a corpus of documents are analyzed to determine candidate words that have a lexical association with all of the cue words. The statistical information includes numerical values indicative of probabilities of word pairs appearing together as adjacent words in a well-formed text or appearing together within a paragraph of a well-formed text. At 1106, for each candidate word, a statistical association score between the candidate word and each of the cue words is determined using numerical values included in the statistical information. At 1108, for each candidate word, an aggregate score for each of the candidate words is determined based on the statistical association scores. At 1110, one or more of the candidate words are selected to be the one or more target words based on the aggregate scores of the candidate words.

Figure 12A:
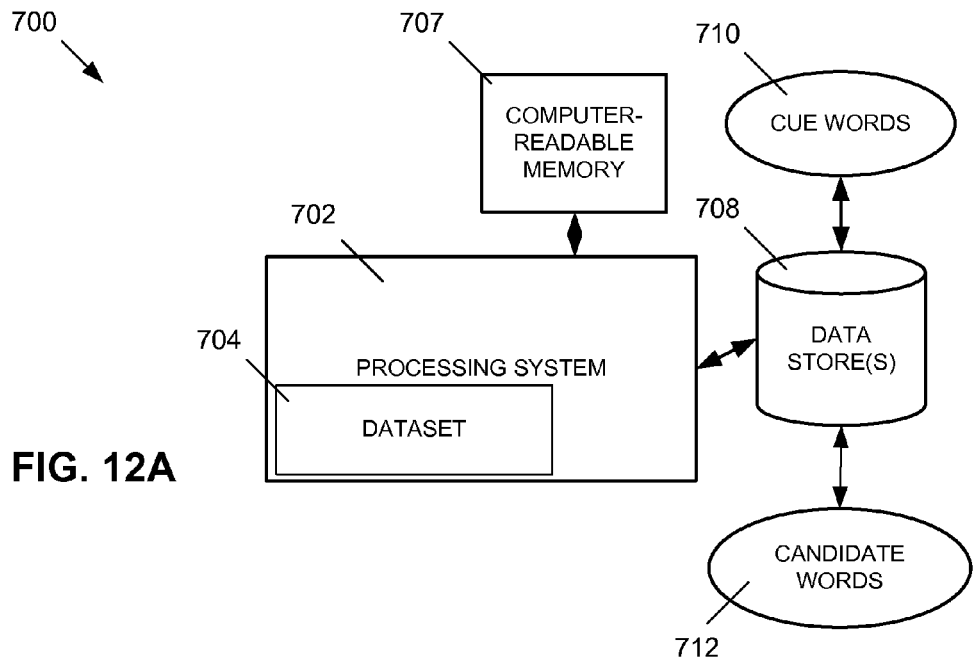
FIGS. 12A, 12B, and 12C depict example systems for determining one or more target words that are strongly related to a plurality of cue words.
Figure 12B:
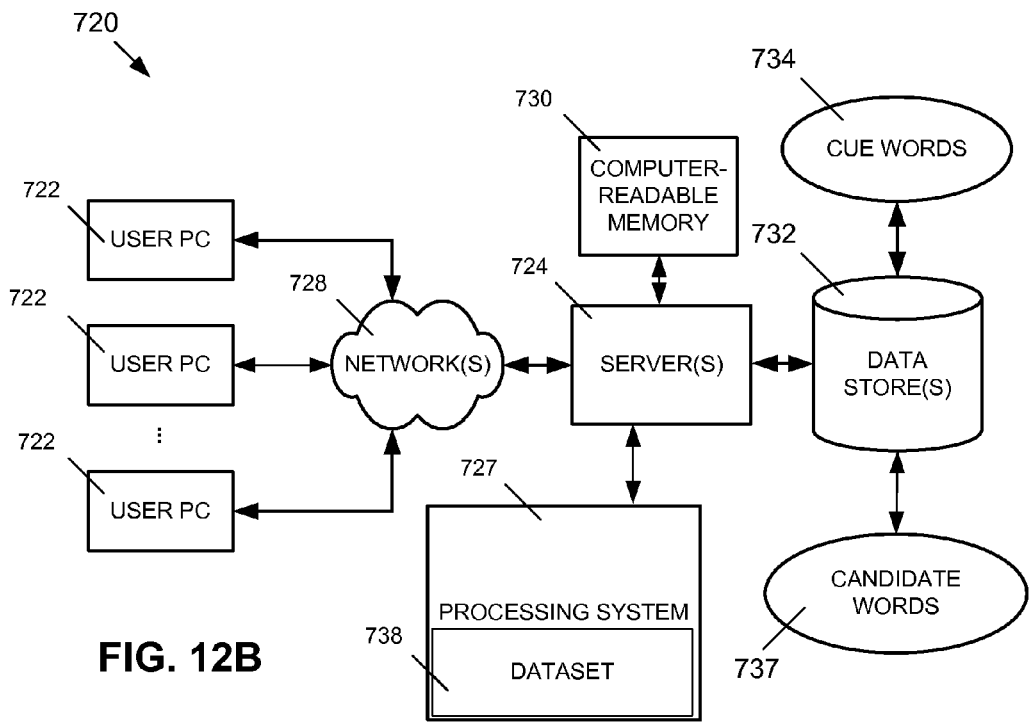
Figure 12C:
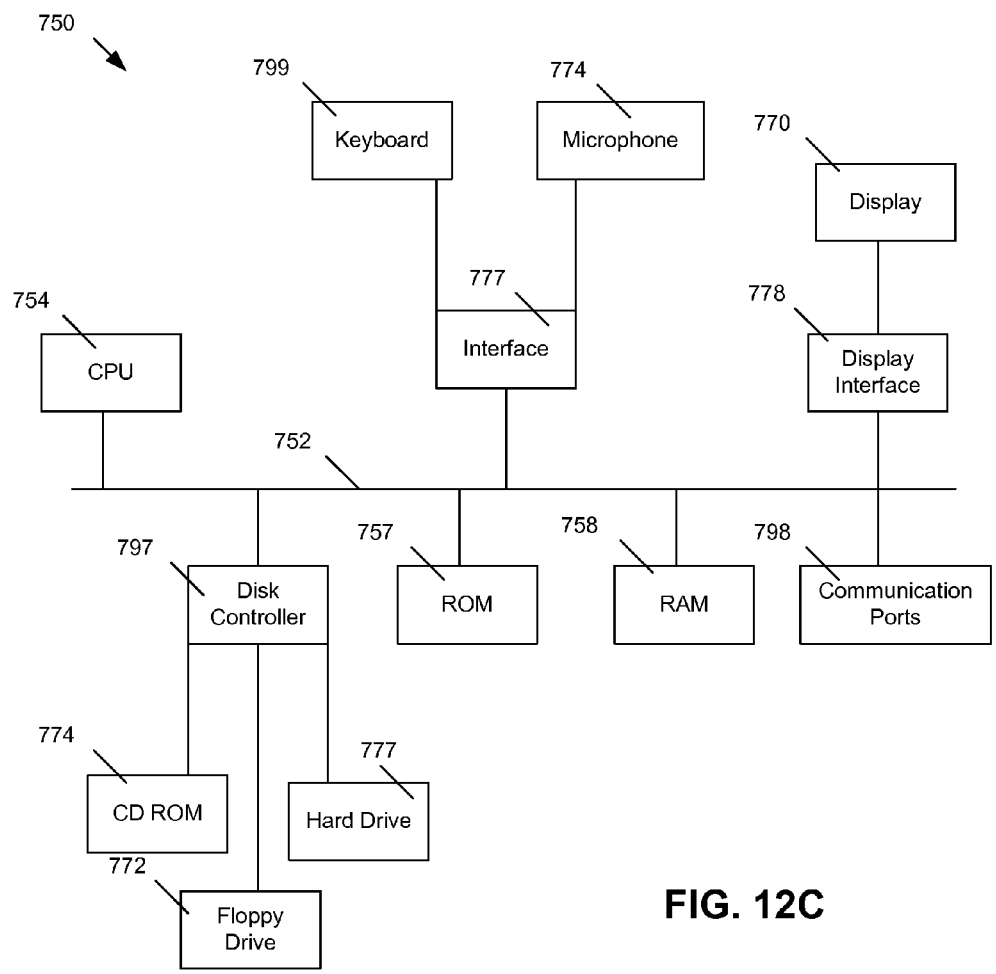

FIGS. 12A, 12B, and 12C depict example systems for determining one or more target words that are strongly related to a plurality of cue words. For example, FIG. 12A depicts an exemplary system 700 that includes a standalone computer architecture where a processing system 702 (e.g., one or more computer processors located in a given computer or in multiple computers that may be separate and distinct from one another) includes instructions 704 for accessing and/or querying a database or dataset. The processing system 702 has access to a computer-readable memory 706 in addition to one or more data stores 708. The one or more data stores 708 may include cue words 710 as well as candidate words 712. The processing system 702 may be a distributed parallel computing environment, which may be used to handle very large-scale data sets.

FIG. 12B depicts a system 720 that includes a client-server architecture. One or more user PCs 722 access one or more servers 724 executing instructions 738 for accessing and/or querying a database or dataset on a processing system 727 via one or more networks 728. The one or more servers 724 may access a computer-readable memory 730 as well as one or more data stores 732. The one or more data stores 732 may contain cue words 734 as well as candidate words 737.

FIG. 12C shows a block diagram of exemplary hardware for a standalone computer architecture 750, such as the architecture depicted in FIG. 12A that may be used to contain and/or implement the program instructions of system embodiments of the present disclosure. A bus 752 may serve as the information highway interconnecting the other illustrated components of the hardware. A processing system 754 labeled CPU (central processing unit) (e.g., one or more computer processors at a given computer or at multiple computers), may perform calculations and logic operations required to execute a program. A non-transitory processor-readable storage medium, such as read only memory (ROM) 756 and random access memory (RAM) 758, may be in communication with the processing system 754 and may contain one or more programming instructions for performing the method for identifying one or more target words of a corpus that have a lexical relationship to a plurality of provided cue words. Optionally, program instructions may be stored on a non-transitory computer-readable storage medium such as a magnetic disk, optical disk, recordable memory device, flash memory, or other physical storage medium.

In FIGS. 12A, 12B, and 12C, computer readable memories 706, 730, 756, 758 or data stores 708, 732, 762, 764, 766 may include one or more data structures for storing and associating various data used in the example systems for identifying one or more target words of a corpus that have a lexical relationship to a plurality of provided cue words. For example, a data structure stored in any of the aforementioned locations may be used to associate numerical values (e.g., probabilities) and word pairs. Other aspects of the example systems for identifying one or more target words of a corpus that have a lexical relationship to a plurality of provided cue words may be stored and associated in the one or more data structures.

A disk controller 797 interfaces one or more optional disk drives to the system bus 752. These disk drives may be external or internal floppy disk drives such as 772, external or internal CD-ROM, CD-R, CD-RW or DVD drives such as 774, or external or internal hard drives 777. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 760, the ROM 756 and/or the RAM 758. The processor 754 may access one or more components as required.

A display interface 768 may permit information from the bus 752 to be displayed on a display 770 in audio, graphic, or alphanumeric format. Communication with external devices may optionally occur using various communication ports 798.

In addition to these computer-type components, the hardware may also include data input devices, such as a keyboard 799, or other input device 774, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

The invention claimed is:

1. A computer-implemented method of automatically identifying one or more target words of a corpus that have a lexical relationship to a plurality of provided cue words, the method comprising:
   receiving a plurality of cue words at a computer system, the computer system executing a software application that is configured to accept the plurality of cue words based on an input received from a user, the plurality of cue words being received from one or more data input devices configured to be used by the user to input the plurality of cue words;
   processing each cue word of the plurality of cue words with a processing system of the computer system to determine one or more inflectional variants of the cue word;
   searching the cue words and the inflectional variants across entries of a dataset or database with the processing system to determine candidate words that have a lexical association with the cue words, the dataset or database comprising statistical lexical information derived from a corpus of documents, the statistical lexical information including (i) first numerical values indicative of probabilities of word pairs appearing together as adjacent words in a well-formed text, and (ii) second numerical values indicative of probabilities of word pairs appearing together within a paragraph of a well-formed text;
   for each candidate word,
      determining, using the processing system, a statistical association score between the candidate word and each of the cue words using the first and second numerical values included in the statistical information, and
      generating, using the processing system, an aggregate score for each of the candidate words based on the statistical association scores;
   selecting one or more of the candidate words to be the one or more target words based on the aggregate scores of the candidate words; and
   outputting via a display the selected one or more candidate words in a graphic or alphanumeric format, the computer system being coupled to the display via a display interface.

2. The computer-implemented method of claim 1, wherein the first and second numerical values include frequency counts, a frequency count indicating a number of times that a word pair appears together as adjacent words in the corpus or a number of times that a word pair appears together within respective paragraphs of the corpus.

3. The computer-implemented method of claim 2, wherein a statistical association score is determined by processing with the processing system a frequency count.

4. The computer-implemented method of claim 1, wherein the statistical lexical information is included in a dataset or database that comprises:
   a plurality of first entries containing bigram data, each first entry including (i) a sequence of two English words, and (ii) an associated numerical value, the numerical value indicating a probability of the sequence appearing in a well-formed text, and
   a plurality of second entries containing co-occurrence data, each second entry including (i) first and second English words, and (ii) an associated numerical value, the numerical value indicating a probability of the first and second English words appearing together within a paragraph in a well-formed text.

5. The computer-implemented method of claim 4,
wherein the numerical values of the first entries are first frequency counts, each first frequency count indicating a number of times that the sequence appears in the corpus; and
wherein the numerical values of the second entries are second frequency counts, each second frequency count indicating a number of times that the first and second English words appear together within respective paragraphs of the corpus.

6. The computer-implemented method of claim 1 comprising:
processing the corpus with the processing system to generate a database or dataset including the statistical lexical information, the processing including:
parsing the corpus with the processing system to identify a plurality of tokens included in the corpus, each token being (i) an individual word, (ii) a punctuation mark, or (iii) a digit-based number of the corpus;
converting with the processing system all tokens comprising digit-based numbers to a uniform token; and
processing the plurality of tokens with the processing system to determine the entries of the database or dataset.

7. The computer-implemented method of claim 1, wherein the generating of the aggregate score comprises summing the statistical association scores between the candidate word and each of the cue words, the sum being the aggregate score.

8. The computer-implemented method of claim 1, wherein the generating of the aggregate score comprises:
for each cue word, generating a ranked list of candidate words, each candidate word of the list (i) being ranked based on its association score with the cue word, and (ii) being associated with a rank value based on its order in the list; and
for each candidate word, multiplying the rank values associated with the candidate word to generate a product, the product being the aggregate score for the candidate word.

9. The computer-implemented method of claim 1, wherein the determining of a statistical association score between a candidate word and a cue word comprises:
determining a Pointwise Mutual Information (PMI) value for the candidate word and the cue word, the PMI value being the statistical association score between the candidate word and the cue word, and the determining of the PMI value comprising:
determining a probability p(A, B) of the candidate word and the cue word (i) appearing together as adjacent words in a well-formed text, or (ii) appearing together within a paragraph of a well-formed text, the probability p(A, B) determined using the statistical information;
determining probabilities p(A) and p(B) of candidate word and the cue word, respectively, appearing in a well-formed text using the statistical information; and
determining the PMI value for the candidate word and the cue word based on $$\log_2 \frac{p(A, B)}{p(A)p(B)}.$$

10. The computer-implemented method of claim 1, wherein the determining of a statistical association score between a candidate word and a cue word comprises:
determining a Normalized Pointwise Mutual Information (NPMI) value for the candidate word and the cue word, the NPMI value being the statistical association score between the candidate word and the cue word, and the determining of the NPMI value comprising:
determining a probability p(A, B) of the candidate word and the cue word (i) appearing together as adjacent words in a well-formed text, or (ii) appearing together within a paragraph of a well-formed text, the probability p(A, B) determined using the statistical information;
determining probabilities p(A) and p(B) of candidate word and the cue word, respectively, appearing in a well-formed text using the statistical information; and
determining the NPMI value for the candidate word and the cue word based on $$\frac{\log_2 \frac{p(A, B)}{p(A)p(B)}}{-\log_2 p(A, B)}.$$

11. The computer-implemented method of claim 1, wherein the determining of a statistical association score between a candidate word and a cue word comprises:
determining a simplified log-likelihood (SLL) value for the candidate word and the cue word, the SLL value being the statistical association score between the candidate word and the cue word, and the determining of the SLL value comprising:
determining a probability p(A, B) of the candidate word and the cue word (i) appearing together as adjacent words in a well-formed text, or (ii) appearing together within a paragraph of a well-formed text, the probability p(A, B) determined using the statistical information;
determining probabilities p(A) and p(B) of the candidate word and the cue word, respectively, appearing in a well-formed text using the statistical information; and
determining the SLL value for the candidate word and the cue word based on $$2*p(A, B)*\log\frac{p(A, B)}{p(A)p(B)} - p(A, B) + p(A)p(B).$$

12. The computer-implemented method of claim 1 comprising:
determining if the plurality of cue words includes a stop word; and
based on a determination that the plurality of cue words does not include a stop word, removing candidate words that are stop words.

13. The computer-implemented method of claim 1 comprising:
processing the selected one or more target words with the processing system to determine one or more inflectional variants for each of the one or more target words, wherein the one or more target words and the inflectional variants thereof are returned in response to a query that includes the plurality of cue words.

14. The computer-implemented method of claim 1, wherein one or more of the statistical association scores is a maximum statistical association score between a candidate word and a cue word, the maximum statistical association score being selected from a plurality of determined statistical association scores between the candidate word and the cue word.

15. A computer-implemented system for automatically identifying one or more target words of a corpus that have a lexical relationship to a plurality of provided cue words, the system comprising:
   a processing system; and
   computer-readable memory in communication with the processing system encoded with instructions for commanding the processing system to execute steps comprising:
   receiving a plurality of cue words at the system, the processing system executing a software application that is configured to accept the plurality of cue words based on an input received from a user, the plurality of cue words being received from one or more data input devices configured to be used by the user to input the plurality of cue words;
   processing each cue word of the plurality of cue words to determine one or more inflectional variants of the cue word;
   searching the cue words and the inflectional variants across entries of a dataset or database to determine candidate words that have a lexical association with the cue words, the dataset or database comprising statistical lexical information derived from a corpus of documents, the statistical lexical information including (i) first numerical values indicative of probabilities of word pairs appearing together as adjacent words in a well-formed text, and (ii) second numerical values indicative of probabilities of word pairs appearing together within a paragraph of a well-formed text;
   for each candidate word,
      determining a statistical association score between the candidate word and each of the cue words using the first and second numerical values included in the statistical information, and
      generating an aggregate score for each of the candidate words based on the statistical association scores;
   selecting one or more of the candidate words to be the one or more target words based on the aggregate scores of the candidate words; and
   outputting via a display the selected one or more candidate words in a graphic or alphanumeric format, the system being coupled to the display via a display interface.

16. The system of claim 15, wherein the first and second numerical values include frequency counts, a frequency count indicating a number of times that a word pair appears together as adjacent words in the corpus or a number of times that a word pair appears together within respective paragraphs of the corpus.

17. A non-transitory computer-readable storage medium for automatically identifying one or more target words of a corpus that have a lexical relationship to a plurality of provided cue words, the computer-readable storage medium comprising computer executable instructions which, when executed, cause a processing system to execute steps comprising:
   receiving a plurality of cue words, the processing system executing a software application that is configured to accept the plurality of cue words based on an input received from a user, the plurality of cue words received from one or more data input devices configured to be used by the user to input the plurality of cue words;
   processing each cue word of the plurality of cue words to determine one or more inflectional variants of the cue word;
   searching the cue words and the inflectional variants across entries of a dataset or database to determine candidate words that have a lexical association with the cue words, the dataset or database comprising statistical lexical information derived from a corpus of documents, the statistical lexical information including (i) first numerical values indicative of probabilities of word pairs appearing together as adjacent words in a well-formed text, and (ii) second numerical values indicative of probabilities of word pairs appearing together within a paragraph of a well-formed text;
   for each candidate word,
      determining a statistical association score between the candidate word and each of the cue words using the first and second numerical values included in the statistical information, and
      generating an aggregate score for each of the candidate words based on the statistical association scores;
   selecting one or more of the candidate words to be the one or more target words based on the aggregate scores of the candidate words; and
   outputting via a display the selected one or more candidate words in a graphic or alphanumeric format.

18. The non-transitory computer-readable storage medium of claim 17, wherein the first and second numerical values include frequency counts, a frequency count indicating a number of times that a word pair appears together as adjacent words in the corpus or a number of times that a word pair appears together within respective paragraphs of the corpus.

19. A computer-implemented method of identifying one or more target n-grams of a corpus that have a lexical relationship to a plurality of provided cue words, the method comprising:
   receiving a plurality of cue words at a computer system, the computer system executing a software application that is configured to accept the plurality of cue words based on an input received from a user, the plurality of cue words being received from one or more data input devices configured to be used by the user to input the plurality of cue words;
   processing each cue word with a processing system of the computer system to determine one or more inflectional variants of the cue word;
   searching the cue words and the inflectional variants across entries of a dataset or database with the processing system to determine candidate n-grams that have a lexical association with the cue words, the dataset or database comprising statistical lexical information derived from a corpus of documents, the statistical lexical information including (i) first numerical values indicative of probabilities of word pairs appearing together as adjacent words in a well-formed text, and (ii) second numerical values indicative of probabilities of word pairs appearing together within a paragraph of a well-formed text;
   for each candidate n-gram,
      determining, using the processing system, a statistical association score between the candidate n-gram and each of the cue words using the first and second numerical values of the dataset, and
      generating, using the processing system, an aggregate score for each of the candidate n-grams based on the statistical association scores;
   selecting one or more of the candidate n-grams to be the one or more target n-grams based on the aggregate scores of the candidate n-grams; and outputting via a display the selected one or more candidate n-grams in a graphic or alphanumeric format, the computer system being coupled to the display via a display interface.

20. A system comprising a processing system and computer-readable memory in communication with the processing system, the computer-readable memory being encoded with instructions for commanding the processing system to execute the method of claim 19.

21. A non-transitory computer-readable storage medium comprising computer executable instructions which, when executed, cause a processing system to execute the method of claim 19.

* * * * *